(12) United States Patent
Hwang

(10) Patent No.: US 11,614,989 B2
(45) Date of Patent: Mar. 28, 2023

(54) METHOD AND APPARATUS FOR INTELLIGENT OPERATION MANAGEMENT OF INFRASTRUCTURE

(71) Applicant: ELECTRONICS AND TELECOMMUNICATIONS RESEARCH INSTITUTE, Daejeon (KR)

(72) Inventor: Jung Yeon Hwang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/367,971

(22) Filed: Jul. 6, 2021

(65) Prior Publication Data
US 2022/0043703 A1 Feb. 10, 2022

(30) Foreign Application Priority Data
Jul. 28, 2020 (KR) .......... 10-2020-0093691

(51) Int. Cl.
G06F 11/00 (2006.01)
G06F 11/07 (2006.01)
G06T 11/20 (2006.01)
G06F 40/40 (2020.01)

(52) U.S. Cl.
CPC ........ *G06F 11/079* (2013.01); *G06F 11/0709* (2013.01); *G06F 11/0751* (2013.01); *G06F 11/0778* (2013.01); *G06F 40/40* (2020.01); *G06T 11/206* (2013.01)

(58) Field of Classification Search
None
See application file for complete search history.

(56) References Cited

U.S. PATENT DOCUMENTS

| 2015/0341380 | A1 | 11/2015 | Heo et al. | |
| 2017/0104775 | A1* | 4/2017 | Vasseur | H04L 43/0876 |
| 2019/0253442 | A1* | 8/2019 | Brabec | H04L 63/1425 |

(Continued)

FOREIGN PATENT DOCUMENTS

| KR | 10-1187023 B1 | 9/2012 |
| KR | 10-1460327 B1 | 11/2014 |

(Continued)

OTHER PUBLICATIONS

Google Scholar/Patents search—text refined (Year: 2022).*

*Primary Examiner* — Christopher S McCarthy
(74) *Attorney, Agent, or Firm* — LRK Patent Law Firm

(57) ABSTRACT

An intelligent operation management apparatus for infrastructure may include a memory and a processor. Herein, the processor may be configured to: collect data by monitoring a resource of an operation target, perform an anomaly detection analysis by various methods of visualization using a graph for the collected data, perform an abnormal prediction analysis for the collected data, and perform pre-maintenance intelligent management based on a result of the anomaly detection analysis and a result of the abnormal prediction analysis. According to an apparatus and method for intelligent operation management of infrastructure, an effect of reducing operation expense and an effect of consecutively providing the quality of service (QoS) may be expected.

18 Claims, 20 Drawing Sheets

(56) References Cited

U.S. PATENT DOCUMENTS

| | | | | |
|---|---|---|---|---|
| 2020/0092316 A1* | 3/2020 | Tang | .................... | H04L 63/1425 |
| 2020/0125390 A1 | 4/2020 | Kim et al. | | |
| 2020/0364128 A1* | 11/2020 | Vittal | .................. | G06F 11/3055 |
| 2021/0028973 A1* | 1/2021 | Côté et al. | ............ | G06N 3/0472 |

FOREIGN PATENT DOCUMENTS

| | | |
|---|---|---|
| KR | 10-1814368 B1 | 1/2018 |
| KR | 10-2002880 B1 | 7/2019 |
| KR | 10-2033169 B1 | 10/2019 |

\* cited by examiner 3 outliers are detected,
The corresponding service is
the service A in 3rd container link b of node b

FIG. 7A

| | | RR_Number of requests received per second | CPU Overall average CPU usage of core | Inter_Number of interruptions generated per second | CTXSW_Number of context switches per second | KBIn_KB data received per second | PktIn_Number of packets received per second | KBOut_KB data transmitted per second | PkOut_Number of packets transmitted per second | RT_Response time(Y) |
|---|---|---|---|---|---|---|---|---|---|---|
| RR_Number of requests received per second | Pearson correlation coefficient | 1 | .591** | .576** | .440** | .490** | .209** | .152** | .523** | .256** |
| | Significance probability (both sides) | | .000 | .000 | .000 | .000 | .000 | .000 | .000 | .000 |
| | N | 8812 | 8812 | 8812 | 8812 | 8812 | 8812 | 8812 | 8812 | 8812 |
| CPU Overall average CPU usage of core | Pearson correlation coefficient | .591** | 1 | .997** | .927** | .670** | .392** | .524** | .956** | .663** |
| | Significance probability (both sides) | .000 | | .000 | .000 | .000 | .000 | .000 | .000 | .000 |
| | N | 8812 | 8812 | 8812 | 8812 | 8812 | 8812 | 8812 | 8812 | 8812 |
| Inter_Number of interruptions generated per second | Pearson correlation coefficient | .576** | .997** | 1 | .936** | .675** | .398** | .533** | .960** | .671** |
| | Significance probability (both sides) | .000 | .000 | | .000 | .000 | .000 | .000 | .000 | .000 |
| | N | 8812 | 8812 | 8812 | 8812 | 8812 | 8812 | 8812 | 8812 | 8812 |
| CTXSW_Number of context switches per second | Pearson correlation coefficient | .440** | .927** | .936** | 1 | .847** | .513** | .746** | .974** | .843** |
| | Significance probability (both sides) | .000 | .000 | .000 | | .000 | .000 | .000 | .000 | .000 |
| | N | 8812 | 8812 | 8812 | 8812 | 8812 | 8812 | 8812 | 8812 | 8812 |
| KBIn_KB data received per second | Pearson correlation coefficient | .490** | .670** | .675** | .847** | 1 | .599** | .804** | .790** | .838** |
| | Significance probability (both sides) | .000 | .000 | .000 | .000 | | .000 | .000 | .000 | .000 |
| | N | 8812 | 8812 | 8812 | 8812 | 8812 | 8812 | 8812 | 8812 | 8812 |
| PktIn_Number of packets received per second | Pearson correlation coefficient | .209** | .392** | .398** | .513** | .599** | 1 | .544** | .475** | .525** |
| | Significance probability (both sides) | .000 | .000 | .000 | .000 | .000 | | .000 | .000 | .000 |
| | N | 8812 | 8812 | 8812 | 8812 | 8812 | 8812 | 8812 | 8812 | 8812 |
| KBOut_KB data transmitted per second | Pearson correlation coefficient | .152** | .524** | .533** | .746** | .804** | .544** | 1 | .736** | .963** |
| | Significance probability (both sides) | .000 | .000 | .000 | .000 | .000 | .000 | | .000 | .000 |
| | N | 8812 | 8812 | 8812 | 8812 | 8812 | 8812 | 8812 | 8812 | 8812 |
| PkOut_Number of packets transmitted per second | Pearson correlation coefficient | .523** | .956** | .960** | .974** | .790** | .475** | .736** | 1 | .844** |
| | Significance probability (both sides) | .000 | .000 | .000 | .000 | .000 | .000 | .000 | | .000 |
| | N | 8812 | 8812 | 8812 | 8812 | 8812 | 8812 | 8812 | 8812 | 8812 |
| RT_Response time(Y) | Pearson correlation coefficient | .256** | .663** | .671** | .843** | .838** | .525** | .963** | .844** | 1 |
| | Significance probability (both sides) | .000 | .000 | .000 | .000 | .000 | .000 | .000 | .000 | |
| | N | 8812 | 8812 | 8812 | 8812 | 8812 | 8812 | 8812 | 8812 | 8812 |

**. Correlation coefficient is significant at 0.01 level (both sides)

METHOD AND APPARATUS FOR INTELLIGENT OPERATION MANAGEMENT OF INFRASTRUCTURE

CROSS REFERENCE TO RELATED APPLICATION

The present application claims priority to Korean Patent Application No. 10-2020-0093691, filed Jul. 28, 2020, the entire content of which is incorporated herein for all purposes by reference.

BACKGROUND OF THE INVENTION

1. Field of the Invention

The present disclosure relates to a method and apparatus for intelligent operation management of infrastructure. More particularly, the present disclosure relates to a method and apparatus for performing pre-maintenance management (PMM) of an operation target through abnormal detection analysis and outlier detection by intelligent graphic analysis.

2. Description of Related Art

Due to fast-developing communication devices in various aspects and for faster provision of services being diversified at users' demands, the information and communication environment has continuously developed. As the new development and expansion of information and communication devices and software necessarily increases signal and data traffic from the perspective of communication network, a communication network is being asked not only to efficiently utilize the existing network resources and structures but also to serve various functions and roles more rapidly. As one solution in this regard, network function virtualization (NFV), software defined networking (SDN) and the like are proposed, and various studies are underway to efficiently use existing networks by utilizing these technologies.

Accordingly, standardization of SDN and NFV technologies is being undertaken recently, and a technology of combining data center infrastructures like server, network and storage with cloud-based SDN/NFV technology has been suggested to provide an application service capable of better satisfying user's demands.

Especially, a study has been undertaken to provide application services (smart city, smart home, smart hospital, smart farm, smart factory, etc.) of the Fourth Industrial Revolution through edge computing and data center infrastructures such as servers of edge nodes, network and storage. A technology of providing an autonomous operation management system, which minimizes an operator's decision-making and executes infrastructure operation management, has been suggested. The technology applied the SDN/NFV technology based on hyper converged infrastructure (HCI) and composable infrastructure hardware (HW).

Meanwhile, a conventional data center has insufficient capability to collect and process big data related to operation management and faces the problem of frequent service interruption since it cannot actively execute integrated management for infrastructure failure pre-prediction, anomaly detection analysis and abnormal prediction analysis. Moreover, in case the conventional data center has an anomaly, it takes a long time for an operator to find the deterioration of service quality and the service interruption and to remove cause. Thus, the consistent and stable quality of service (QoS) cannot be ensured, and the problem of high operating expense (OPEX) occurs because of inefficiency of operation management.

SUMMARY

With intent to solve the above-described problems of the related art, an object of the present disclosure is to provide an apparatus and method for intelligent operation management of infrastructure.

Another object of the present disclosure is to provide an apparatus and method for intelligent operation management of an active data center and cloud virtualization infrastructure.

Another object of the present disclosure is to provide operational convenience and efficiency by minimizing an operator's decision-making and to provide stable and ensured quality of service (QoS).

Other objects and advantages of the present disclosure will become apparent from the description below and will be clearly understood through embodiments of the present disclosure. Also, it will be easily understood that the objects and advantages of the present disclosure may be realized by means of the appended claims and a combination thereof.

The intelligent operation management device for infrastructure according to the present disclosure may comprise a memory and a processor, wherein the processor comprises a data collection analytics platform (DCAP) module that is configured to collect data by monitoring a resource of an operation target, to perform an anomaly detection analysis of the collected data by a real-time visualization method, and to perform an abnormal prediction analysis looking for abnormal traffic by applying the collected data.

The intelligent operation management method for infrastructure according to the present disclosure may comprise collecting data by monitoring a resource of an operation target, performing an anomaly detection analysis of the collected data by a real-time visualization method and performing an abnormal detection analysis looking for abnormal traffic for the collected data.

The computer program stored in a non-transitory computer-readable storage medium for intelligent operation management of infrastructure according to the present disclosure may execute collecting data by monitoring a resource of an operation target, performing an anomaly detection analysis of the collected data by a real-time visualization method and performing an abnormal detection analysis for looking for abnormal traffic for the collected data, in a computing device.

The DCAP module according to the present disclosure may be further configured to express a report for a result of the anomaly detection analysis and a result of the abnormal traffic prediction analysis by means of a graph and natural language that is generated for analysis result interpretation.

The analysis result report according to the present disclosure may be configured to perform augmented analytics based on the generated natural language by applying an analytics framework (AF) to the DCAP module.

The anomaly detection analysis according to the present disclosure may be configured to determine, by applying a data movement management platform (DMMP) module to the DCAP module, whether or not the collected data have at least one anomaly among a point anomaly, a collective anomaly and a contextual anomaly, based on a graphical visualization method.

The anomaly according to the present disclosure may be based on detection of an outlier using at least one, as a graphical visualization method, among a scatter plot, a box plot, a box-and-whisker plot, a notched box whisker plot, a timeseries plot, a histogram, a stem & leaf plot, and a control chart, by applying an anomaly detection analysis system (ADAS) module to the DCAP module.

The prediction analysis according to the present disclosure may be configured to perform, by applying an abnormal prediction analysis system (APAS) module to the DCAP module, a cluster analysis, which is performed for abnormal traffic in a state where no information on abnormal traffic exists in advance, a discriminant analysis, which is performed for abnormal traffic in a state where information on a group exists in advance, and a classification analysis for determining and classifying abnormal traffic for a new sample.

The discriminant analysis according to the present disclosure may be configured to perform, by applying an analytics framework (AF) to the DCAP module, at least one discriminant analysis among a linear discriminant analysis, a quadratic discriminant analysis, a canonical discriminant analysis, and a K-nearest neighbor (KNN) discriminant analysis.

The classification analysis, by applying a DMMP module to the DCAP module, according to the present disclosure may be at least one among a classification analysis by Fisher's discriminant function, a classification analysis by a discriminant function using prior probability information, a classification analysis by a distance function, and a logistic regression classification analysis by a posterior probability.

A result according to the anomaly detection analysis and a result according to the abnormal traffic prediction analysis may be used to perform pre-operation management of the ICT infrastructure operation target according to the present disclosure.

The pre-operation management according to the present disclosure may comprise predicting an outlier, an abnormal fault and a failure of the operation target by using history data of a software error and a fault or failure of hardware of the operation target.

The predicting of an abnormal traffic fault and failure of the operation target according to the present disclosure may comprise predicting inherent availability associated with a design characteristic of the operation target, an outlier associated with the pre-operation management, an outlier applying at least one of an abnormal operation and an operation associated with a failure, an abnormality, and a failure.

The operation target according to the present disclosure may comprise at least one among a computing device, a server, a network, and a storage, and wherein the pre-operation management is configured to generate a graph and natural language based on an analysis result report for the anomaly detection analysis and an analysis result report for the prediction analysis looking for the abnormal traffic, and perform augmented analytics that comprises natural language in an interpretation of an analysis result.

The operation target according to the present disclosure may be an ICT infrastructure based on software defined networking (SDN) and network function virtualization (NFV).

The cluster analysis according to the present disclosure may perform, by applying an APAS module to the DCAP module, a hierarchical cluster analysis or a nonhierarchical cluster analysis.

The hierarchical cluster analysis according to the present disclosure may be based on at least one among a single linkage method, a complete linkage method, an average linkage method, a centroid linkage method, a Ward linkage method, and a median linkage method, by using a hierarchical clustering model.

The nonhierarchical cluster analysis according to the present disclosure may be configured to analyze by dividing into groups based on at least one among a K-means method and an X-means method, using a nonhierarchical clustering model, and represent an analysis result in a graphical form of a tree diagram or a dendrogram. The cluster analysis according to the present disclosure may be configured to derive similarity or distance between the traffic based on at least one among a Euclidean distance, a standardized distance, a Minkowski distance, a Mahalanobis distance, a Kanberra distance, a Chebychev distance, and a Manhattan distance.

The prediction analysis looking for the abnormal traffic according to the present disclosure may be based on supervised learning or unsupervised learning, by applying an APAS module to the DCAP module.

BRIEF DESCRIPTION OF THE DRAWINGS

FIGS. 7A and 7B are views showing multiple scatter plots of anomaly detection analysis results according to an embodiment of the present disclosure.

DETAILED DESCRIPTION

Figure 1:
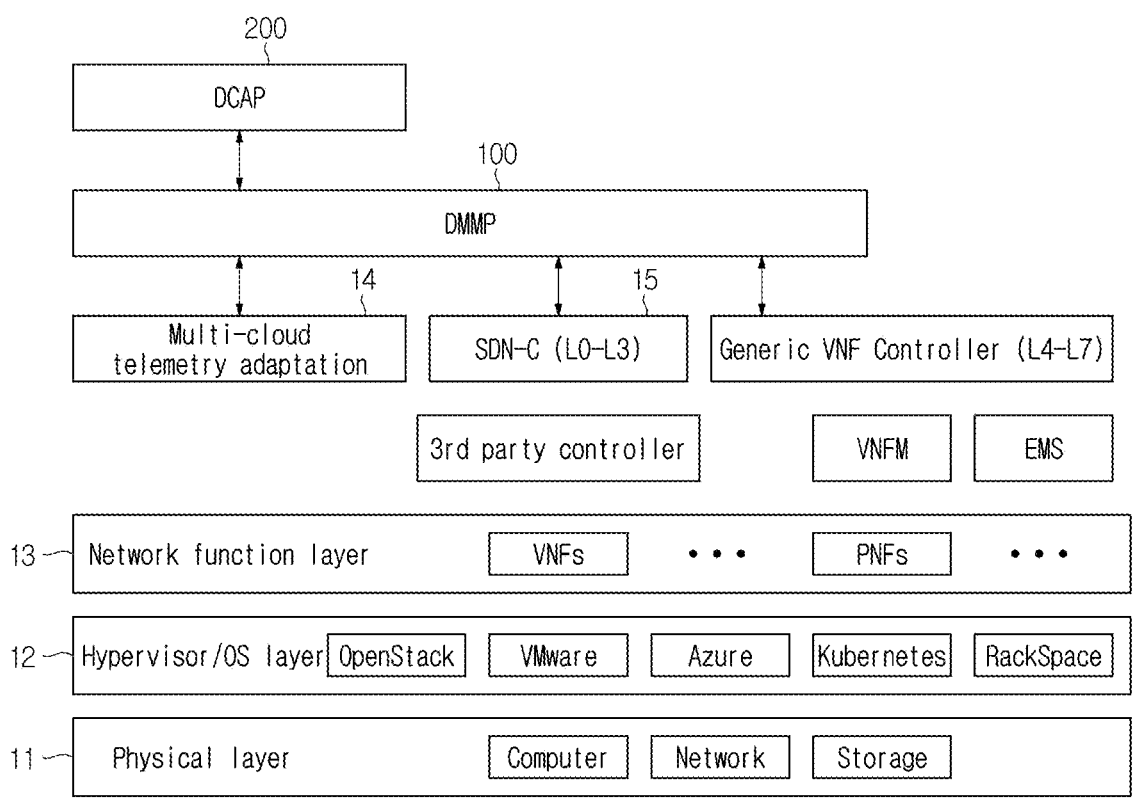
FIG. 1 is a view showing a concept of resource management related to the structure of data center infrastructure applicable to the present disclosure.

Hereinafter, embodiments of the present disclosure will be described in detail with reference to the accompanying drawings, which will be easily implemented by those skilled in the art. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. In addition, parts not related to the description of the present disclosure in the drawings are omitted, and like parts are denoted by similar reference numerals.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. Also, embodiments that include other components in addition to the components described in the various embodiments are also included in the scope of the present disclosure.

Terms like 'first', 'second', 'A' and 'B' may be used to describe various components, but the components are not to be construed as being limited to the terms. The terms are only used to differentiate one component from other components. For example, the 'first' component may be named the 'second' component without departing from the scope of the present disclosure, and the 'second' component may also be similarly named the 'first' component. The term 'and/or' includes a combination of a plurality of relevant items or any one of a plurality of relevant terms.

When an element is referred to as being "connected to" or "coupled to" another element, it should be understood that the former element is directly connected to or directly coupled to the latter element or the former element is connected to or coupled to the latter element, having yet another element intervening therebetween. In contrast, when an element is referred to as being "directly coupled" or "directly connected" to another element, it should be understood that there is no intervening element in between.

The terms used in the present application are merely used to describe particular embodiments, while not being intended to limit the present disclosure. Singular expressions include plural expressions unless the context clearly indicates otherwise. In the present application, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

Unless defined otherwise, all the terms descriptive or scientific used herein have the same meaning as conventionally understood by those skilled in the art. Terms, which are generally used and defined in a dictionary, should be interpreted to have meanings congruous to those in the context of a related art and need not be interpreted to have ideal or excessively formal meanings, unless obviously defined in the present application.

The present disclosure relates to a technology of autonomously performing operation management of an operation target through an automated report produced by augmented analytics, which includes outlier detection, pre-prediction of abnormal context, an output graph through an optimal pre-prediction model and natural language generated thorough an automated process among autonomous operation management technologies that constantly ensure rapid application service provision and quality of service (QoS) via optimal decision-making of artificial intelligence (AI). The technology minimizes an operator's own decision-making for a context occurring while the operator operates a target including data center infrastructure and facilities in a software defined datacenter (SDDC).

More particularly, operation management of an operation target may be autonomously performed through pre-prevention and pre-prediction for the operation target by using threshold cross analytics (TCA), failure detection alarm (FDA), pre-failure prediction (PFP), anomaly detection analysis (ADS), abnormal prediction analysis (APA), natural language generation (NLG), augmented analytics (AA) and pre-maintenance management system (PMMS) in a level 2 AI operator assistance system of autonomous operation management (AOM), which has functions of detecting and analyzing outliers of infrastructure or fault and failure caused by abnormal operations, finding an optimal model of an abnormal estimation/prediction equation, and alarming/alerting an operation orchestrator UI through a report of the result (pre-failure prediction (PFP)) before the onset of failure via a pop-up, short message service (SMS), and a smartphone application by applying various statistical estimation/prediction/forecasting model algorithms of data mining based on big data collected during the operation of ICT SDDC infrastructure (server, network, storage).

Also, the present disclosure proposes autonomous operation management that implements quality of service (QoS) by performing pre-maintenance prior to an outbreak of fault/failure. Herein, an operator's decision-making is minimized by applying various algorithms including a statistical algorithm of ultimately and optimally estimated/predicted data mining, algorithms of supervised learning, which corresponds to deep learning (DL) of AI, unsupervised learning and reinforcement learning, and a statistical analytic algorithm to an analytics framework (AF) module of a data collection/analysis platform (DCAP), and a report of prediction results for fault/failure is stored in which graphs and natural language are generated by an automated process, and is immediately delivered to the operator.

Thus, as the operator immediately takes a prior action (repair) for infrastructure in virtue of the report of predicted results of fault/failure, the operating expense may be reduced due to the pre-prevention and prediction of failure and QoS may be continuously ensured.

According to the present disclosure, when an outlier and abnormal traffic occur in infrastructure of a current datacenter, the outlier may be automatically detected and the abnormal traffic and service may be automatically predicted and analyzed. When outlier traffic occurs during the operation of infrastructure (server, network, storage), the conventional method generates an alarm message in a form of SMS or pop-up message on an operator UI display or operator's application and then a subsequent infrastructure operator investigates a cause of fault/failure for corresponding equipment and service according to the alarm and takes an action (repair work). Accordingly, the quality of service is degenerated or it takes a long time to remove the cause with the interruption of service. Thus, it is possible to solve another problem of the absence of QoS or the failure to ensure QoS of the application service provided without interruption.

The present disclosure proposes an apparatus and method for intelligent operation management by providing an operator managing an operation target, which includes a datacenter and a cloud virtualization infrastructure, with a technology of preventing and predicting fault/failure (abnormal traffic) through anomaly detection analysis, abnormal prediction analysis and pre-maintenance technologies in an anomaly detection analysis system (ADS), an abnormal prediction analysis system (APAS), a pre-maintenance prediction system (PPS) and a pre-maintenance management system (PMS) and with augmented analytics (AA) through autonomous execution of every step of process in a report form including natural language and graphs based on natural language generation (NLG).

According to the present disclosure, a technology of intelligent operation management may be expected which provides operational convenience and efficiency by minimizing an operator's decision-making. An intelligent operation apparatus and method of the present disclosure may depend on implementable ADS, APS, NLG and AA technologies.

More particularly, according to the present disclosure, first, as for a function of level 2 AIOAS in AOMS technology of ICT infrastructure, operation management based on an automated process may be performed in a semi-autonomous or partial-autonomous way by implementing a pre-detection and prediction algorithm for infrastructural abnormality (fault) through an apparatus and method that apply ADA and APA to TCAS, ADAS, NG-IMS, AF module of DCAP and PFPS module based on AI and statistical model.

Second, for pre-failure prediction (PFP), an optimal model is determined by utilizing big data collected during the operation of infrastructure and by applying various statistical estimation/prediction models of data mining to an analytics framework (AF). In a module of AF, an algorithm corresponding to artificial intelligent deep learning (ALDL) and a statistical optimal model is applied to the AF as an algorithm type module. Then, a report of augmented analytics, which includes pre-prediction results of outliers, abnormalities, faults and failures along with visualized graphs and generated natural language, may be automatically stored by an autonomic process periodically updated for big data during the operation of infrastructure for outliers, abnormalities, faults and failures in various contexts. Next, as the report is notified (via alarm, mail, application, etc.) and provided to an operator, the operator, not be specialized in statistics/AI though, may easily understand and grasp a probable failure of infrastructure in advance by seeing the report including pre-failure predictions and augmented analytics through graphs and generated natural language. Thus, integrated maintenance and management may be performed by taking an action (repair work) before an outlier, an abnormality, a fault or a failure occurs in infrastructure.

Meanwhile, in the description of the present disclosure, traffic and entity may be used interchangeably.

Hereinafter, embodiments of the present disclosure will be described with reference to the accompanying drawings.

FIG. 1 is a view showing the datacenter infrastructure and the architecture of facilities, which may become an operation target applicable to the present disclosure, and a concept of resource management including data collection and analysis that may be included in pre-maintenance management (PMM) for the target according to an embodiment of the present disclosure. That is, an embodiment of FIG. 1 assumes that an operation target is datacenter infrastructure and facility. FIG. 1 includes infrastructure, particularly the structure of datacenter infrastructure, and a framework in which data collection and analysis are executed for the infrastructure.

Figure 16:
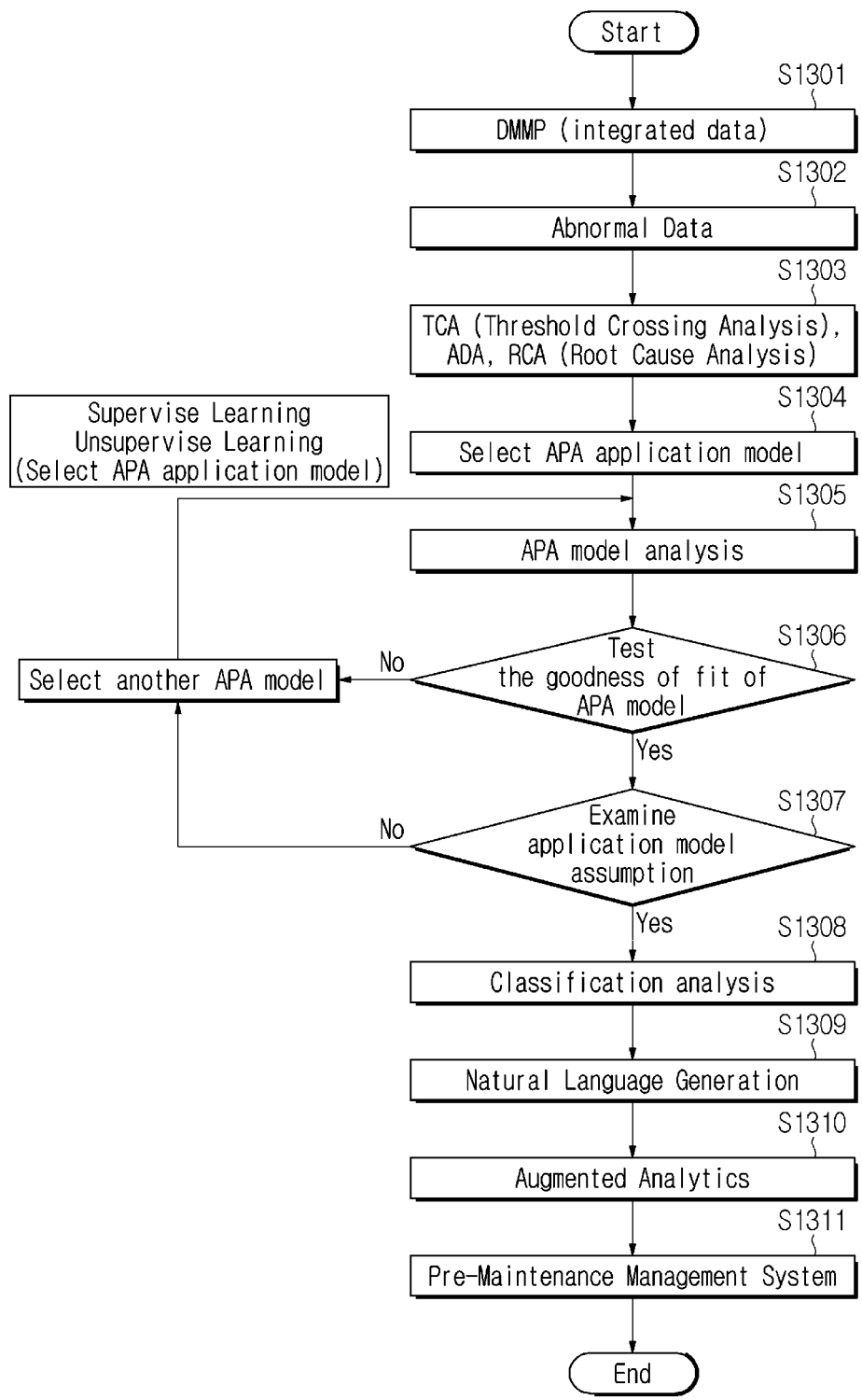
FIG. 16 is a view showing a flow chart of an intelligent operation method according to an embodiment of the present disclosure.

The infrastructure of FIG. 1 may be a datacenter infrastructure providing an application service, and for resource management included pre-maintenance management proposed in the present disclosure, a data movement platform (DMMP) 100 and a data collection analytics platform (DCAP) 200 may be used to collect and analyze operation-related big data generated during the operation of infrastructure. An intelligent operation apparatus may be based on the DMMP and the DCAP. In one embodiment, the intelligent operation apparatus may be the same as illustrated in FIG. 16.

A datacenter infrastructure, which is an operation target according to an embodiment of the present disclosure, may include physical hardware 11, an operating system or hypervisor 12, a network function layer 13, multi-cloud adaptation 14, SDN-C 15, and a generic NF controller (GNFC) 16.

In one embodiment, the physical layer 11 may be a layer including physical hardware of a datacenter infrastructure and may include a computer, a network and a storage.

In one embodiment, the hypervisor/OS layer 12 may generate a virtual machine (VS), a container, and the like by including various hypervisors (openstack, Vmware, Azure, Kubernetes, Rackspacc, etc.) or OS providing an integrated virtual machine for physical hardware like computer, network and storage.

In one embodiment, the network function layer 13 may provide a virtualized network function (VNF) and a physical network function (PNF) for interconnection of a VM and a container that are virtualized.

Herein, the VNF may provide an application function to serve a protocol for a software-based VNF to a VM and a container. That is, the VNF may be a software-based application capable of providing one or more network services and may provide a programmable and expandable network service and a network connection using a virtualized infrastructure provided by a network functions virtualization infrastructure (NFVI).

In addition, as a layer implementing a connection to network equipment that is physical hardware, the PNF may perform communication via standard Ethernet (IEEE 802.3), ethernet for storage connection, FC, or NIC like InfiniBand.

Meanwhile, virtualized network function managers (VNFM) may perform a function of collecting and providing monitoring information on instance status for individual VNF instances through each element management (EM).

The multi-cloud adaptation 14 as cloud virtualized infrastructure managements (VIMS) generates a virtual machine and a container for a physical infrastructure (e.g., a computer, a network, a storage, etc.), creates a work load and executes networking and cloud modeling. Thus, the multi-cloud adaptation 14 may periodically generate one or more pieces of monitoring information among FCAPS(Fault, Configuration, Account, Performance, Security), KQI(Key Quality Indicators), QoE(Quality of Experience), KCI(Key Capacity Indicators), KPI(Key Performance Indicators) and SLA(Service Level Agreement) on the basis of meta data for telemetry and may provide the information to the DMMP 100.

The SDN-C 15 may perform a function of a controller of SDN and may perform a function of 0 to 3 layers. The SDN-C 15 may perform configuration management by means of a border gateway protocol (BGP), vLAN and Netconf/Yang that are SDN protocols.

An SDN-C platform may also provide functions of installing and starting a service logic interpreter (SLI), a MySQL database and an open-day light (ODL) and may apply a data plane development kit (DPDK) for improving performance. The SDN-C platform may also virtualize a network interface card (NIC) by applying single root I/O virtualization (SR-IOV) and thus reduce a cycle of CPU and not use a CPU of server, thereby improving the performance of transmitting telemetry data. That is, the SDN-C may use SR-IOV in order to improve the performance of network traffic delivery between NIC and a guest OS.

In a word, the SDN-C may provide IP/VNF assignment, L2 service generation, L3 VPN service generation, network configuration management, VNF configuration management, service function chaining (SFC) management, microservice API, configuration management by Netconf/Yang, and connection via operations support system (OSS) API. In addition, the SDN-C may include a function of collecting data for SD-WAN generation, TE tunneling generation, BGP configuration management, SW upgrade and status information of network equipment.

The generic VNF controller (GNFC) 16 includes functions of an application controller (APPC) and a virtualized network function controller (VFC) and may include functions of configuring VNF/PNF/service layers 1 to 7 and of managing a lifecycle.

More specifically, the GNFC provides functions of model-driving lifecycle management by generating a microservice, start/stop management, audit (monitoring), heal check, L4^L7 service, auto scaling in/out, service condition management, and software upgrading. In addition, the GNFC stores a micro service logic, VNF descriptors, config templates, a workload rule, a policy cache, and event-related data through a repository and may provide a connection with DMMP.

Meanwhile, the DMMP 100, which is a platform for performing data movement management, is a platform for providing a data movement service that transmits data to every target at every source and performs relevant processing. That is, as platform of data filtering, transmission and processing, the DMMP may provide the following specific functions.

Data filtering function: may be a function of preliminary stage for compressing and transmitting data by implementing a lifecycle of a data processing process in which the data are pre-collected/converted for data analysis at an edge node (MEC/Cloudlet/OEC) and a core node.

Data transmission function: is a transmission function into a data collector and to a datacenter collector. Herein, both file-based and event-based data transfers may be applied and used as data transfer methods, and a data transmission process may provide a function of transferring and managing data with a minimum waiting time (latency), guaranteed delivery (delay) and high availability solutions.

Data processing function: may provide a function of processing data collection processing/conversion so that data can be collected and converted with less latency and more throughput and be utilized for failure diagnosis of infrastructure using a statistic model and for a failure prediction analytics module and also provide a function for real-time data processing.

In one embodiment, the DMMP 100 may be built by Apache Kafka or data warehousing of Hadoop and may collect messages delivered through Restful API and big data through monitoring and store the messages and the big data in a storage.

The data collection analytics platform (DCAP) 200, which is a platform of data collection and analysis, applies a PFPS, a PMPS and a PMMS based on AI and a statistical model in a threshold crossing analytics system (TCAS), a failure detection alarming system (FDAS), a next generation-intelligent monitoring system (NG-IMG), and an algorithm module of analytics framework (AF) for event (fault/failure) analysis, pre-diagnosis and analysis, root cause analysis (RCA), threshold crossing analytics and pre-failure analysis by using big data of the DMMP 100 collected from the multi-cloud adaptation 14, the SDN-C 15 and the VNF controller 16. Thus, performing analysis and obtaining an analysis result, the DCAP 200 executes natural language generation (NLG) and augmented analytics (AA) using graphs and an autonomic process, thereby implementing intelligent integrated operation management.

For linkage to the DMMP 10, the DCAP 200 may provide NG-IMG functions like a collection framework, which is a big-data platform, an analytics platform, to which a prediction analysis algorithm is applied, NLG, AA, DMMP control, DCAP control and DCAP orchestration.

Meanwhile, although FIG. 1 illustrates the DCAP 200 and the DMMP 100 as separate blocks, the DMMP 100 may exist as an integral form or a separate system inside the DCAP 200. As FIG. 1 illustrates one embodiment of a concept of infrastructure and resource management applicable to the present disclosure, a resource management process and an operation management target, which may be included in a method and apparatus for intelligent operation management of the present disclosure, is not limited to the illustration of FIG. 1.

In addition, the resource management process illustrated in FIG. 1 may be included in a method for intelligent operation management of infrastructure illustrated in FIGS. 13 to 16 or may be implemented by an apparatus for intelligent operation management of infrastructure.

Figure 2:
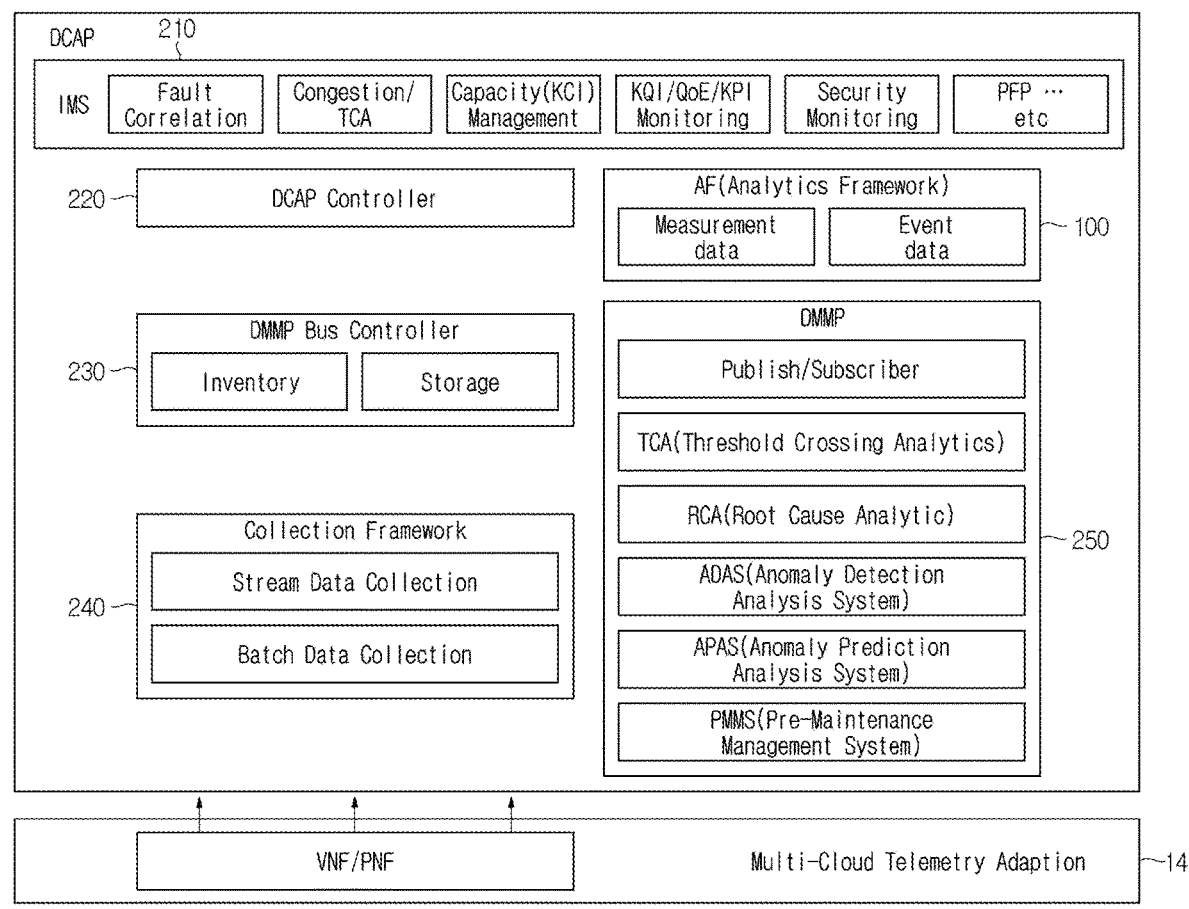
FIG. 2 is a view showing a block diagram of intelligent operation management apparatus for infrastructure according to an embodiment of the present disclosure.

FIG. 2 is a view showing a block diagram of an AI platform for big data collection and analytics and a big-data platform of an apparatus for intelligent operation management for a datacenter and an edge computing infrastructure that may be operation targets according to an embodiment of the present disclosure.

In one embodiment, the data collection analytics platform (DCAP) of FIG. 2 shows a framework architecture for collecting and analyzing big data, which occur during the operation of an application service of a physical or virtual device of infrastructure, and may represent a platform including a next-generation intelligent monitoring system (IMS) 210.

In other words, FIG. 2 may show a framework architecture of the DCAP that collects big data, which occur during the operation of a physical or virtual device of infrastructure, and analyzes the big data by applying an algorithm of a statistical model and an AI/DL algorithm.

In one embodiment, as orchestration for providing a UI display utilized by an operation or an analyzer in a framework architecture of DCAP, a DCAP orchestrator may include an intelligent monitoring system (IMS) 210, DCAP control management 220, linkage management of DMMP 100, DMM bus control management 230, a big data collection framework 240, and an analytics framework (AF) 250 including algorithms of various types of statistical models and an AI/DL algorithm.

In one embodiment, the IMS 210 may automatically store a report including natural language generation and augmented analytics and may automatically provide the report using an automated process. The report includes prior notification/alarm/notice for fault/failure or event through TCAS of DCAP and FDAS, a fault/failure diagnosis result using an algorithm module of AF, a RCA result based on fault/failure correlation analysis for TCA, a content of a result report (analysis result of an optimal model and visualized graphic form) for PFP, monitoring results of FDAS and TCAS for FCAPS, KCl, KQI, QoE, KPI and SLA, pre-failure prediction and analysis of AF, anomaly prediction, and a prediction analysis result generated by a pre-maintenance prediction algorithm.

The DCAP controller 220 may be configured by including a plurality of APIs and may provide status information of a resource via a reporting API (VM Status, Service Instance Status) and an API.

The DMMP bus controller 230 provides a data transfer management function based on a large file and an optimized file. The DMMP bus controller 230 may operate in two forms: operation by a message transfer bus for a router and operation in a data router form playing a role of bus that performs file transfer. That is, the DMMP bus controller may deliver big data of messages, events and data routing. The collection framework 240 collects stream data and data of a batch file.

That is, the collection framework 240 may collect event stream data and batch file data from the multi-cloud telemetry adaptation 14 and big data concerning outlier, abnormality, fault/failure and performance from a service, a network and an infrastructure via a simple network management protocol (SNMP), Syslog, JSON and Rest API.

The DMMP 100 may collect big data including measurement data and event data through service monitoring. Measurement data may include key performance indicators (KPI), key quality indicators (KQI), quality of experience (QoE), and key capacity indicators (KCl). As data related to fault or failure, event data may include data of failure, configuration, account, performance and security (FCAPS).

The analytics framework 250 may include diagnosis analysis (DA), threshold crossing analysis (TCA), correlation analysis (CA), root cause analysis (RCA), pre-failure prediction (PFP), anomaly detection analysis system (ADS), abnormal prediction analysis system (APAS), natural language generation (NLG), augmented analysis (AA), pre-maintenance management system (PMMS) and the like. Each analysis is performed through a statistical algorithm, and a result report may be provided in an automated process where a graph and natural language are generated based on the analysis.

The analytics framework (AF) may be a framework including a statistical algorithm of data mining including DA, TCA, CA, PFP, ADAS, APAS, NLG, AA and PMMS. A result report may be stored in a repository and be provided to an operator. The result report may include predictive statistics based on an analysis result of an optimal model using each of various statistical model algorithms (correlation analysis, regression analysis, non-linear increase curve model, time series analysis, nonlinear model, classification analysis (discriminant analysis), decision-making tree analysis, logistic regression analysis, cluster analysis, factor analysis, principal component analysis, etc.), model-driven statistics, a visualized graph and generated natural language. The analysis result report may be provided through an IMS so that an operator can open and see it on a UI screen of the IMS in a repository storing the pre-failure prediction report of infrastructure.

The pre-maintenance management system (PMMS) may be a system that records, saves and manages dates and contents of maintenance works (repair/measure) for pre-prevention of infrastructure failure through NLG and AA in a result report of ADA, APA and PFP and provides the results to an operator.

Meanwhile, in FIG. 2, as one embodiment of the present disclosure, the block diagram illustrates an operation management apparatus for implementing an analytics framework by utilizing data via big data collection/cleaning/conversion. However, the collection framework 240, which is a big-data platform, the framework of a big data analytics platform 250, and the DMM 100, which are illustrated in FIG. 2, may be operated in a linkage or connection with hardware like a processor, a memory and a database, which are included in an apparatus for intelligent operation management of infrastructure, and may be implemented only by a processor, a memory, a database, etc. Also, the present disclosure is not limited to what is mentioned above.

That is, a collection framework, an analytics framework, a DMMP may exist in a form of program including one or more commands, and the one or more commands may be stored in a memory of an operation management apparatus and/or a separate storage and may be executed by a processor within the operation management apparatus.

Figure 3:
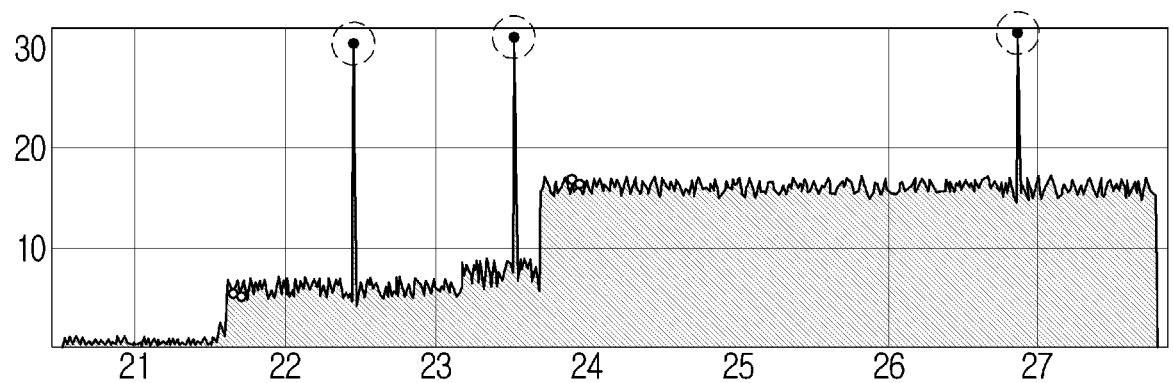
FIG. 3 is a view showing an anomaly detection analysis result according to an embodiment of the present disclosure.
Figure 4:
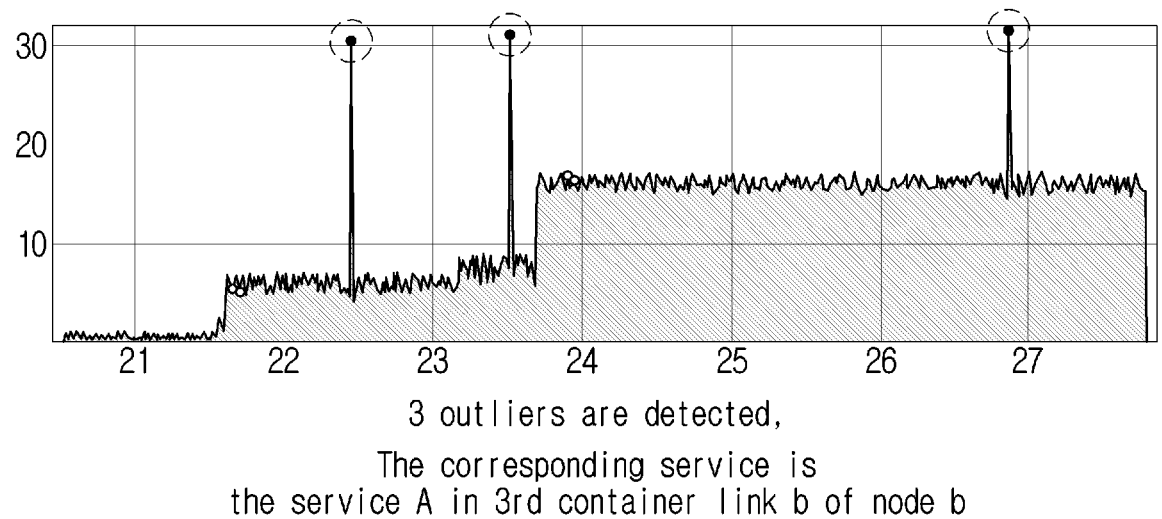
FIG. 4 is a view showing natural language automatically generated based on an anomaly detection analysis result according to an embodiment of the present disclosure.

FIG. 3 is a view conceptually showing a result of ADA in a graph based on event monitoring according to an embodiment of the present disclosure, and FIG. 4 is a view showing how natural language, which is automatically generated based on the ADA graph by an automated process, appears to an operator according to an embodiment of the present disclosure.

Hereinafter, along with fault/failure prediction using a PFP model, anomaly detection analysis (ADA), abnormal prediction analysis (APA), and a corresponding pre-maintenance management system (PMMS), which are proposed in the present disclosure, will be described in detail.

1. Anomaly Detection Analysis (ADA)

Anomaly detection analysis is an analysis method of detecting an abnormal operation that is not anticipated. Anomaly detection aims to prevent an abnormal operation in advance. In the present disclosure, anomalies may be classified into 3 types.

① Point anomaly: means a behavior with a distinctive (aberrant) status occurring at a single point in a same group. It is also referred to as outlier/extreme value.

② Collective anomaly: exists as an abnormal value for a long time in a plurality of clearly distinctive herding behaviors. It mainly refers to a case in which a buffer-overflow occurs in a system like infrastructure PNF and VNF.

③ Contextual anomaly: refers to a behavior that is determined as abnormal in consideration of a context. It may seem to be normal when the context is not clearly understood. One example occurs in a sequential event (buffer-overflow, ssh, ftp, etc.) and corresponds to a web attach in a general case. A case of collecting event data and ftp copying a file are exceptional.

Network behavior anomaly detection (NBAD) is an analysis method for network security threat detection. It is an analysis method for a system that detects a security threat mainly based on a packet signature. Accordingly, NBAD is applied as a method for network security using a firewall through constant monitoring of a pattern and trend of abnormal traffic, an intrusion detection system, virus vaccine software and spyware detection software.

The NBAD analysis technology applies the following 4 methods for network and security monitoring.
① Log analysis
② Packet inspection system
③ Packet flow monitoring system
④ Root analysis As main detection analysis techniques, detection methods in payload, protocol, virus detection and link connection are as follows.
① Payload anomaly detection
② Protocol anomaly: MAC spoofing
③ Protocol anomaly: IP spoofing
④ Protocol anomaly: TCP/UDP fanout
⑤ Protocol anomaly: IP fanout
⑥ Protocol anomaly: Duplicate IP
⑦ Protocol anomaly: Duplicate MAC
⑧ Virus detection
⑨ Bandwidth anomaly detection
⑩ Connection rate detection Anomaly detection analysis (ADA) may be performed by applying exploratory data analysis (EDA). EDA is a method for knowing an attribute expressing data by using raw data. An EDA for anomaly detection analysis may be performed through a suitable model and visualization.

In the present disclosure, an EDA may be performed by applying an analysis method in the form of bar graph & histogram, a line graph, a scatter plot, and a box plot.

In one embodiment, a bar graph in an outlier detection method is also referred to as a bar chart or a histogram and may be used to detect and consider a part far off the bar graph as an outlier for a packet flow collected with x-axis as time unit and data for log analysis.

In another embodiment, a line graph in an outlier detection method may be used to detect an outlier that increases drastically(sharply) far off the line graph for a packet flow collected with x-axis as time unit and data for log analysis.

FIG. 3 is a view showing an anomaly detection analysis result on a line graph according to an embodiment of the present disclosure. FIG. 4 shows outliers detected at 3 points as a result of packet flow detection. FIG. 4 is a view showing natural language that is automatically generated by an automated process for the outlier detection graph of FIG. 3. The natural language explains to an operator that 3 outliers are detected and the corresponding service is the service A in 3rd container link b of node b.

Figure 5:
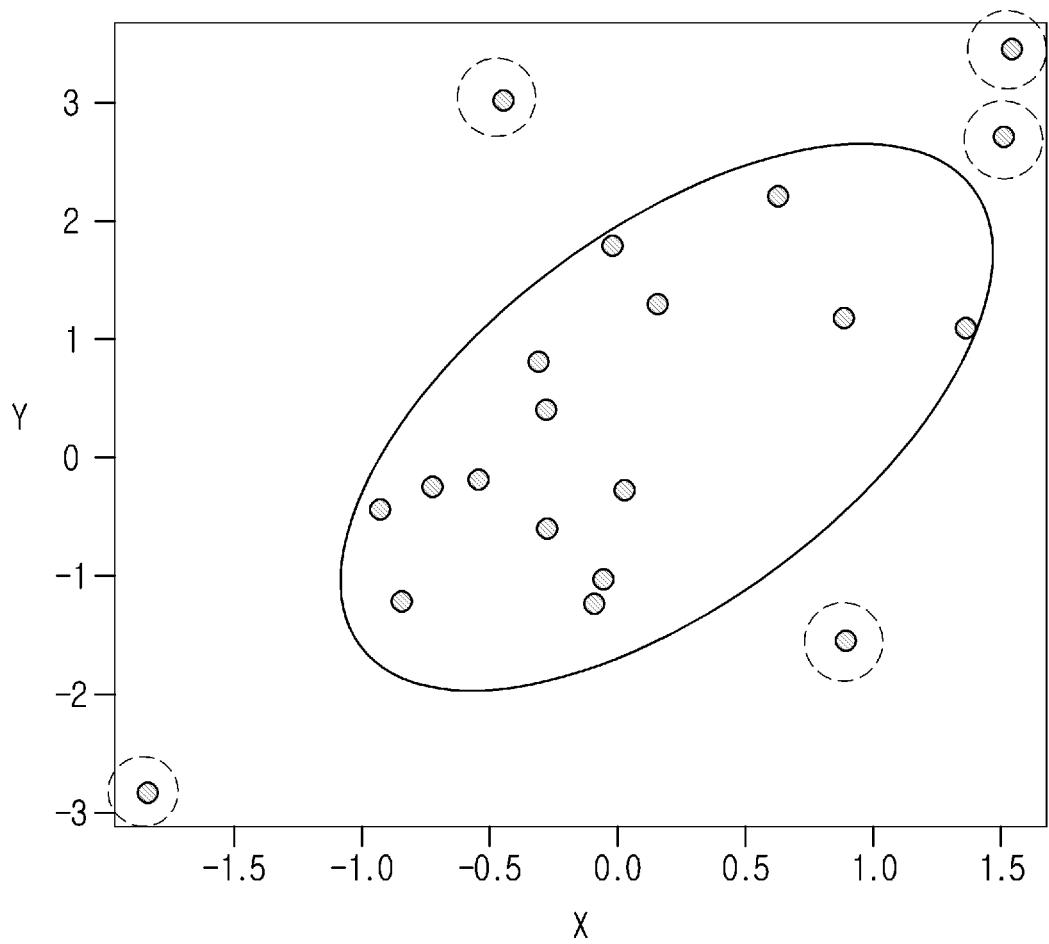
FIGS. 5 and 6 are views showing scatter plots of anomaly detection analysis results according to an embodiment of the present disclosure.

Also, FIG. 5 shows a detection result of 5 outliers using orthogonal coordinates between 2 variables in an anomaly detection analysis by scatter plot according to an embodiment of the present disclosure.

Figure 6:
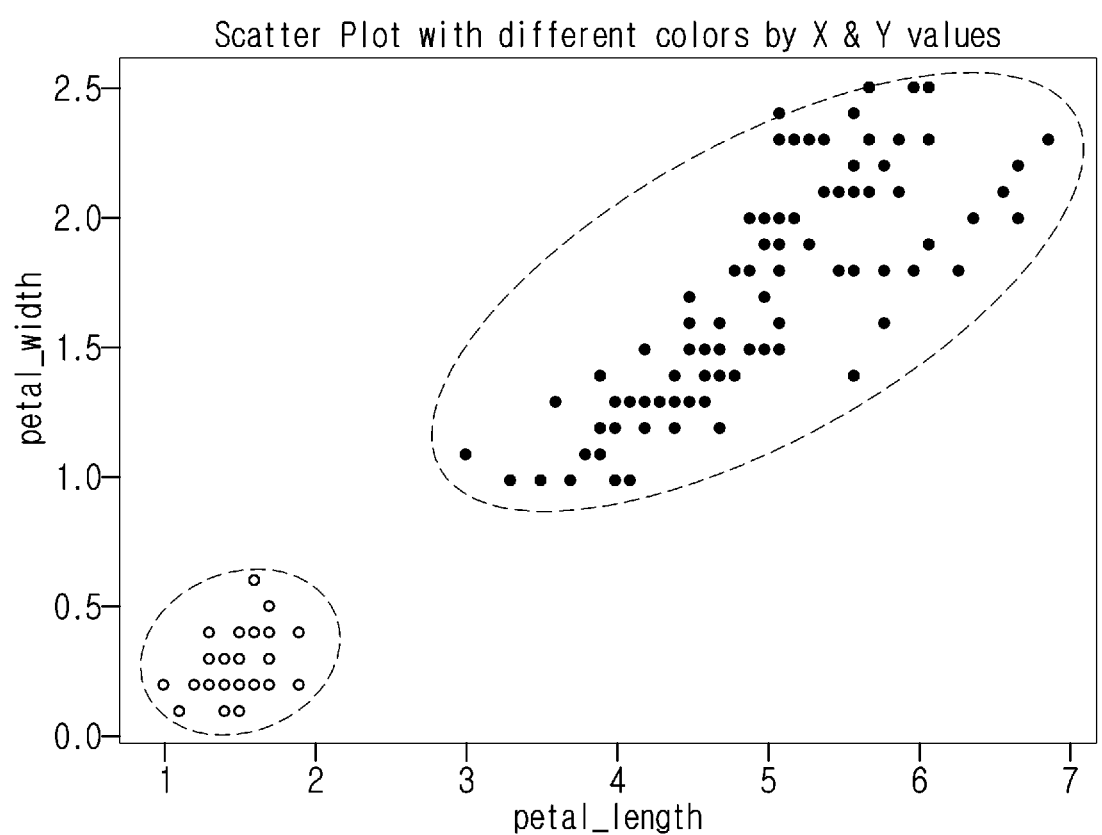

FIG. 5 and FIG. 6 present anomaly detection analysis results on scatter plots according to an embodiment of the present disclosure. Referring to FIG. 5 and FIG. 6, a form of data deviating from massed data is detected as an outlier.

In FIG. 5, 5 datasets out of the whole group may be expected as outliers. FIG. 6 includes a total of 2 groups, and data deviating from a group located above or below may be expected as outlier. In the case of traffic, the outlier represents a result of virus or an occurrence of abnormal traffic.

Figure 7B:
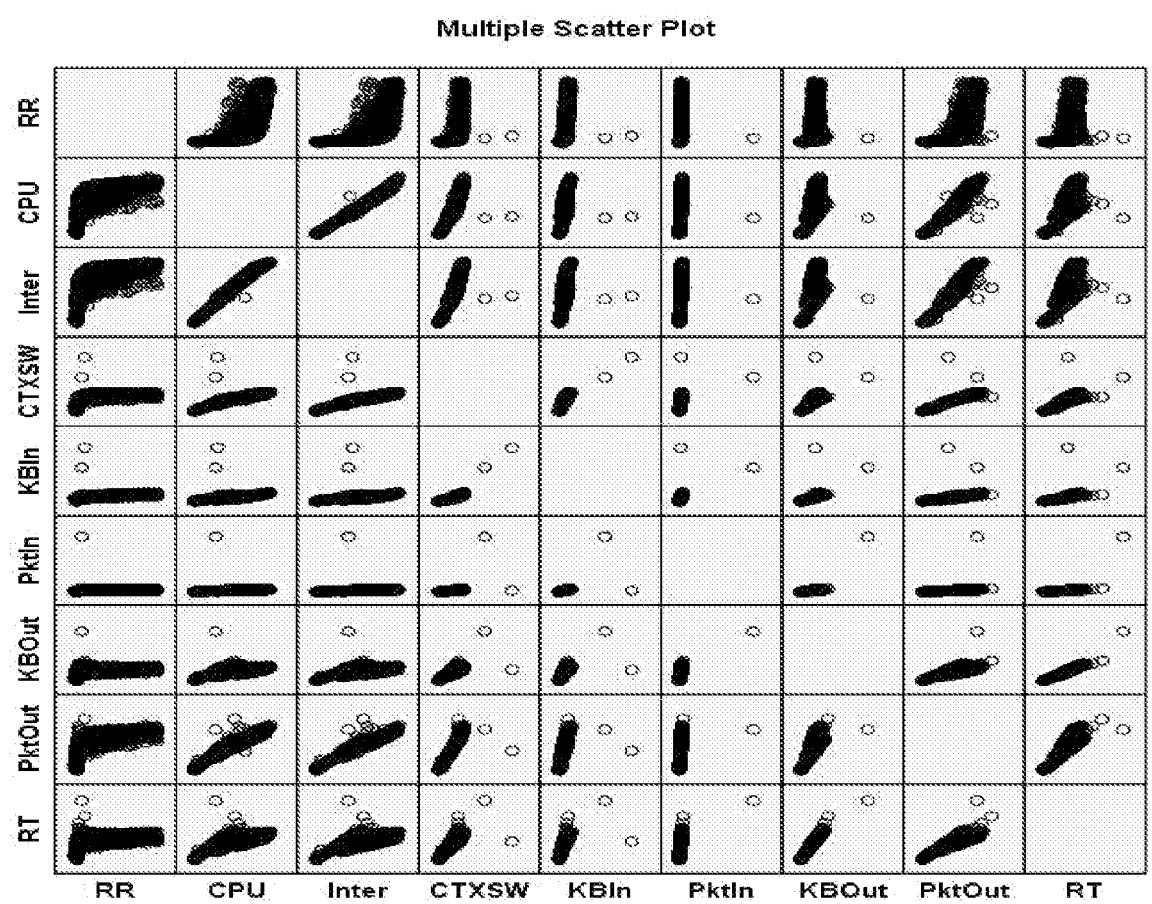

FIG. 7A and FIG. 7B show a correlation between variables by displaying a multiple scatter plot as a result of a multiple correlation analysis on graphs.

Figure 8:
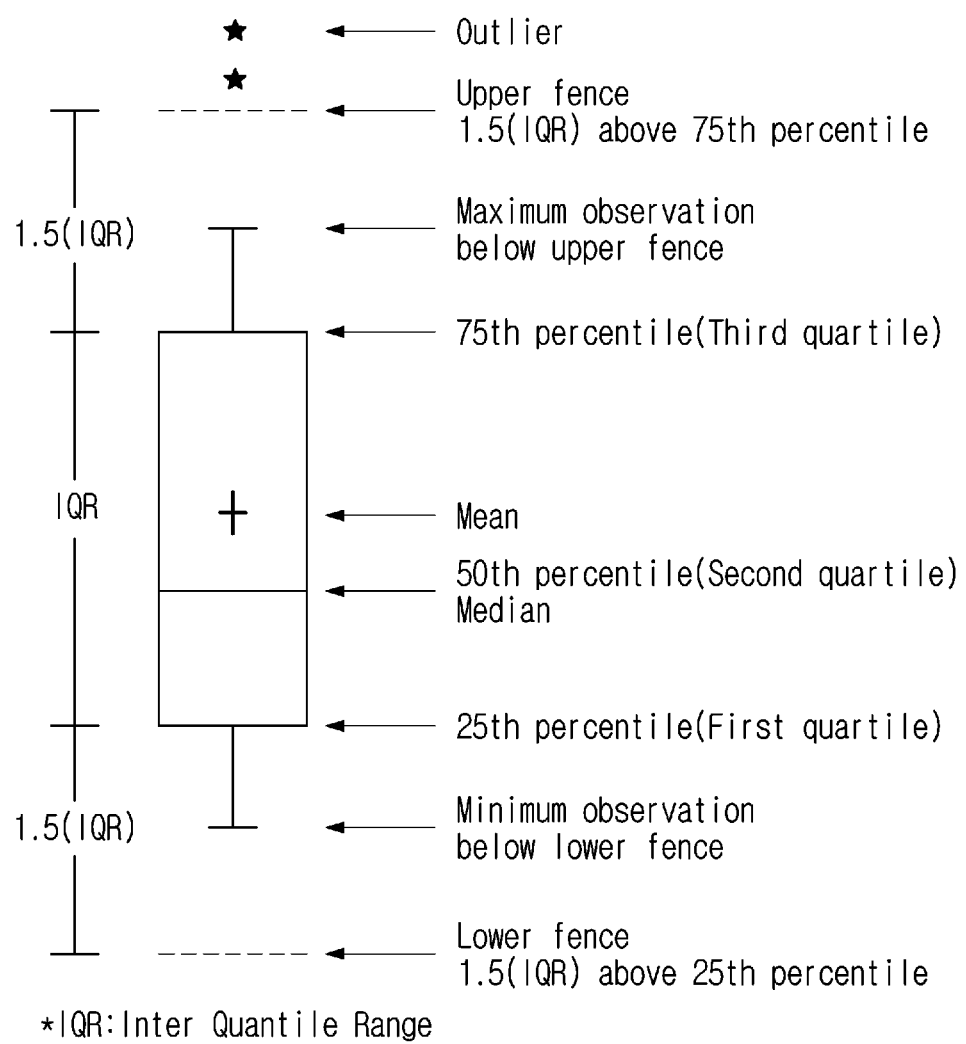
FIG. 8 is a view showing a box whisker plot available for anomaly detection analysis according to an embodiment of the present disclosure.

FIG. 8 is a view referred to as either a box plot or a box-and-whisker plot, which may be a graph numerically representing data.

Meanwhile, the graph of a box plot is not drawn using raw data that are not processed, but the graph is based on five-number summary statistics obtained from data. The five-number summary (statistics) includes a minimum value, a first quartile(Q1), a second quartile(Q2), a third quartile (Q3), and a maximum value. Unlike the histogram, the box plot may represent a multiplicity of groups in a single space.

Quartiles are values that divide samples of data in 4 equal parts, and may be described as in the table below.

| Quartiles Description | description |
| --- | --- |
| First quartile($Q_1$) | 25% of data are equal to or less than this value. |
| Second quartile($Q_2$) | 50% of median data are equal to or less than this value. |
| Third quartile($Q_3$) | 75% of data are equal to or less than this value. |
| Interquartile range | As the distance between $Q_1$ and $Q_3$ ($Q_3$-$Q_1$), this is a range for the median 50% of data. |

A box plot may be drawn in the following order.
① Calculate each quartile from given data.
② Draw a rectangle with a first quartile (Q1) and a third quartile (Q3) as base and draw a line at a location corresponding to a second quartile (Q2) that is a median.
③ Calculate an interquartile range (IQR=Q3−Q1).
④ Connect a maximum value among values with a difference form Q3 of 1.5 IQR or below to Q3 by a straight line and also connect a minimum value among values with a difference from Q1 of 1.5 IQR or below to Q1 by a straight line.
⑤ Indicate a value exceeding Q3 by 1.5 IQR or above and a value smaller than Q1 by 1.5 IQR or above by using a circle or asterisk and consider the values as outliers.

Figure 9:
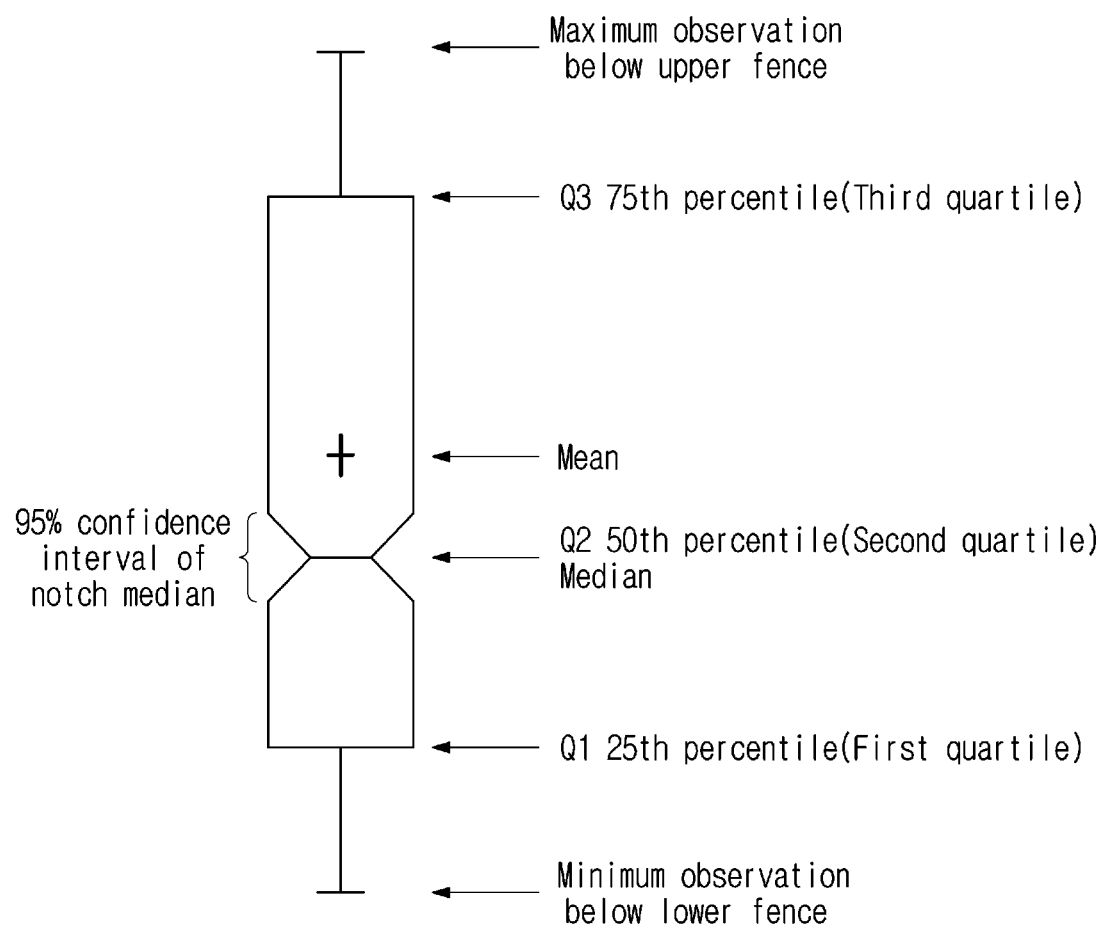
FIG. 9 is a view showing a notched box whisker plot available for anomaly detection analysis according to an embodiment of the present disclosure.

A box plot may be expressed by 2 types of views, a box whisker plot and a notched box whisker plot, which are shown in FIG. 8 and FIG. 9 respectively.

That is, FIG. 8 shows a box whisker plot that may be used for an anomaly detection analysis according to the present disclosure, and FIG. 9 may show 95% confidence interval of a median on a graph through a notched box whisker plot that may be used for an anomaly detection analysis according to the present disclosure.

Figure 10:
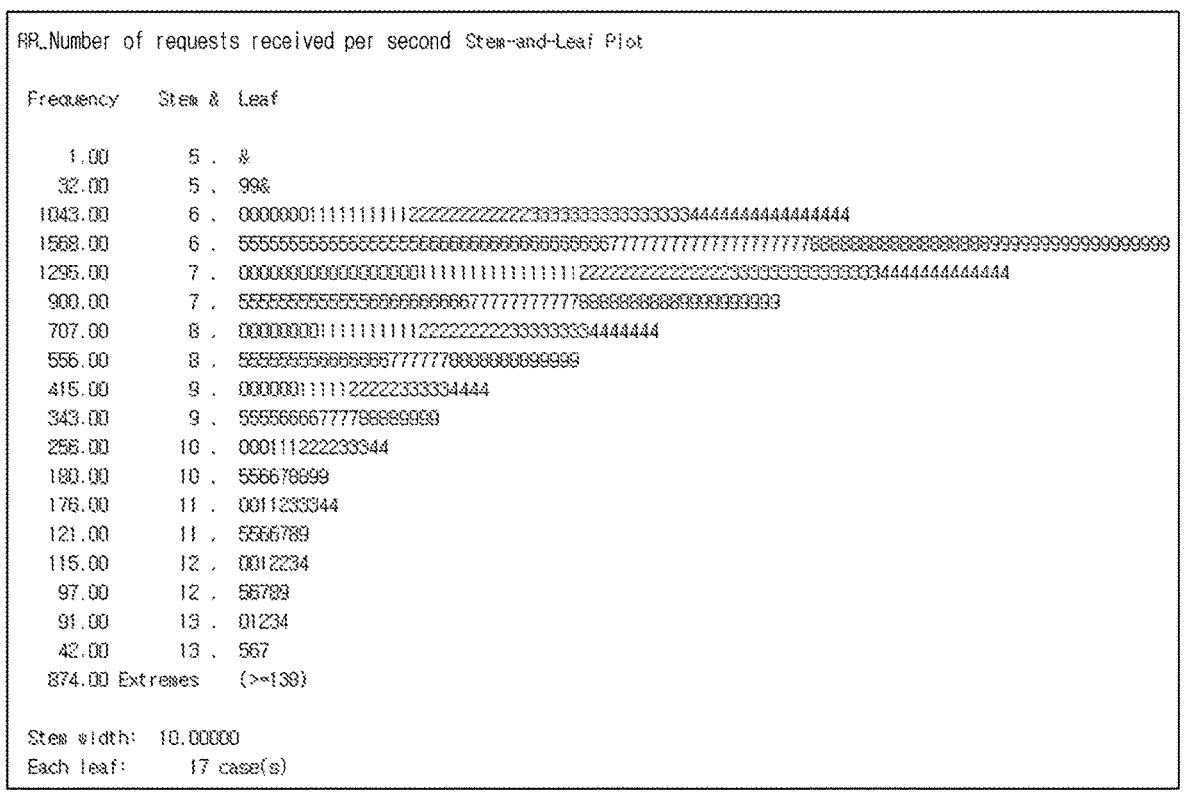
FIG. 10 is a view showing a stem & leaf plot available for anomaly detection analysis according to an embodiment of the present disclosure.

FIG. 10 is a stem & leaf plot that may show a method of graphically determining a distributional feature of data, which are applied to an analysis, and anomaly detection.

FIG. 10 shows a method of presenting a schematic view by classifying data in ascending order. For example, in the result view of FIG. 10, 13. corresponds to the stem, and the leaf represents 567, which actually represents data values of 13.5, 13.6 and 13.7. The frequency indicates that 42 datasets are actually included.

Figure 11:
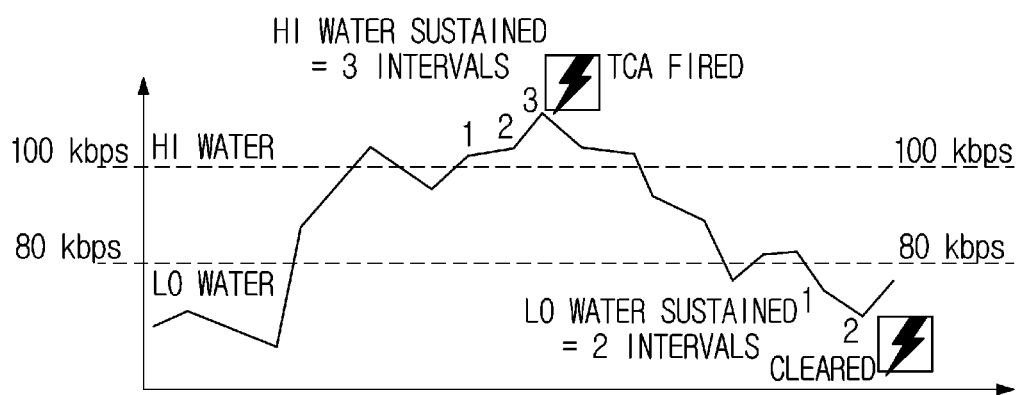
FIG. 11 is a view showing a time series plot available for anomaly detection analysis according to an embodiment of the present disclosure.

FIG. 11 is a view showing a control chart, which illustrates a graphical analysis method for anomaly detection through a statistical management method for the uniformity (low dispersion) of quality by determining whether a degree of dispersion (scattering, variation) of data is a change cause (safety status, management status) or an assignable cause (unstable status, abnormal status) and thus by maintaining a stable status.

FIG. 11 shows a statistical analysis method that is applied for efficiently managing a resource. Herein, an upper control limit and a lower control limit are obtained by applying a control limit, and when the upper control limit is exceeded, the resource is scaled up, and when the lower control limit is exceeded, the resource is scaled down.

FIG. 11 shows a graphical analysis method for performing anomaly detection by applying control charts like Xbar chart, R chart, X chart, median chart, weighted average chart, control chart, and L-S chart.

2. Abnormal Prediction Analysis System (APAS)

As a system for an abnormal prediction analysis, an abnormal prediction analysis system (APAS) may be a prediction system that performs classification for finding out abnormal traffic and abnormal behavior through a cluster analysis and a discriminant analysis for threat or risk, which is considered as abnormal traffic in the traffic of network equipment (router, switch, VPN), firewall as security equipment, enterprise security management (ESM) system, intrusion detection system (IDS), intrusion prevention system (IPS), anti-virus scanner, web server, DDos dedicated equipment, and threat management system (TMS).

2.1 Abnormal Prediction Analysis-Cluster Analysis

Cluster analysis is one of multivariate analysis methods that identifies characteristics of clusters, which are generated by distinguishing n entities based on a multiplicity of values of variables $(x_1, x_2, \ldots, x_p)$ observed in each entity, and analyzes a relationship between clusters. No separate response variable (dependent variable $y_i$) is applied to multivariate data used for a cluster analysis, and a cluster is formed only based on similarity between entities. That is, the cluster analysis is a multivariate analysis used for a case in which no categorical data as dependent variable ($y_i$) is included.

In a cluster analysis, there is no advance information on a cluster or category (group information), and a multivariate analysis method of naturally dividing a whole into several clusters only based on a distance or similarity among entities is used. Thus, not only entities but also variables may be grouped according to a degree of similarity. However, the difficulty with the cluster analysis consists in how to define a distance between clusters. In ICT field, the cluster analysis may be applied as a method of detecting and analyzing an outlier in network traffic and performing a prediction for abnormal traffic.

One big problem in a cluster analysis is that when multivariate variables applied to the cluster analysis have different units, the magnitude of variation is different among the variables so that a variable with a larger unit has a significant impact on measurement of distance (similarity) of entities (data). Accordingly, transformation into a standard normal distribution with the average of 0 and the standard deviation of 1 needs to be performed beforehand for variate standardization for unifying units of variates.

In case of skewness or kurtosis in which data of a variable are biased to any one side, log transform, root square transformation or standardization may be performed to keep raw data intact but make it have a characteristic of normal distribution. There is no limitation on the method of testing normality, but a Q-Q plot may be used, for example.

Distance may be used as a method for measuring similarity or proximity between observation vectors for clustering of a cluster analysis.

To calculate a distance for measuring similarity in a cluster analysis, the following 7 types of formulas for calculating the distance between two p-dimensional vectors $x=(x_1, x_2, \ldots, x_p)'$ and $y=(y_1, y_2, \ldots, y_p)'$ may be applied.

① Euclidean Distance $$d(x,y)=\sqrt{(x_1-y_1)^2+\ldots+(x_p-y_p)^2}=\sqrt{(x-y)'(x-y)}=\sqrt{\|x\|^2+\|y\|^2-2xy}$$

② Standardized distance or statistical distance $$d(x,y)=\sqrt{(x-y)'D^{-1}(x-y)}, \text{herein}, D=\text{diag}\{S_{11},S_{22},\ldots,S_{pp}\} \text{ is a}$$

sample variance matrix.

③ Minkowski Distance $$d(x,y) = \left[\sum_{i=1}^{p}|x_i - y_i|^m\right]^{1/m},$$

herein, m>0.

④ Mahalanobis Distance $$d(x,y)=\sqrt{(x-y)'S^{-1}(x-y)}, \text{herein}, S=\{S_{ij}\} \text{ is a sample}$$

covariance matrix.

⑤ Kanberra Distance $$d(x,y) = \sum_{i=1}^{p}\frac{|x_i - y_i|}{(x_i + y_i)}$$

⑥ Chebychev Distance $$d(x,y)=\max_i |x_i-y_i|$$

⑦ Manhattan Distance $$d(x,y) = \sum_{i=1}^{p}|x_i - y_i|$$

Clustering methods are hierarchical clustering, nonhierarchical clustering or partitioning clustering, density-based clustering, model-based clustering, lattice-based clustering, kernel-based clustering, Kohenen clustering, and a method for high-dimensional data. Hereinafter, these clustering methods will be described in detail.

(1) Hierarchical Clustering Method

Hierarchical clustering is a method of forming a desired number of clusters by repeating a process of binding entities with closest similarity. Conventionally, a result of merging near entities with close similarity is given in a form of tree diagram or dendrogram, and each entity belongs to only one cluster.

There are two types of hierarchical clustering methods: agglomerative hierarchical methods and divisive hierarchical methods. The first one merges close clusters one by one by calculating a distance between clusters, and the other separates distant clusters one by one.

Agglomerative hierarchical methods make a new cluster by binding close clusters and ultimately form a single cluster.

Divisive hierarchical methods begin by dividing a whole into two clusters, separate different entities and finally make each entity form a cluster.

As for a method of confirming a cluster analysis result, a result report shows a process of being agglomerated or divided in a graphical form of tree diagram or dendrogram.

Figure 12:
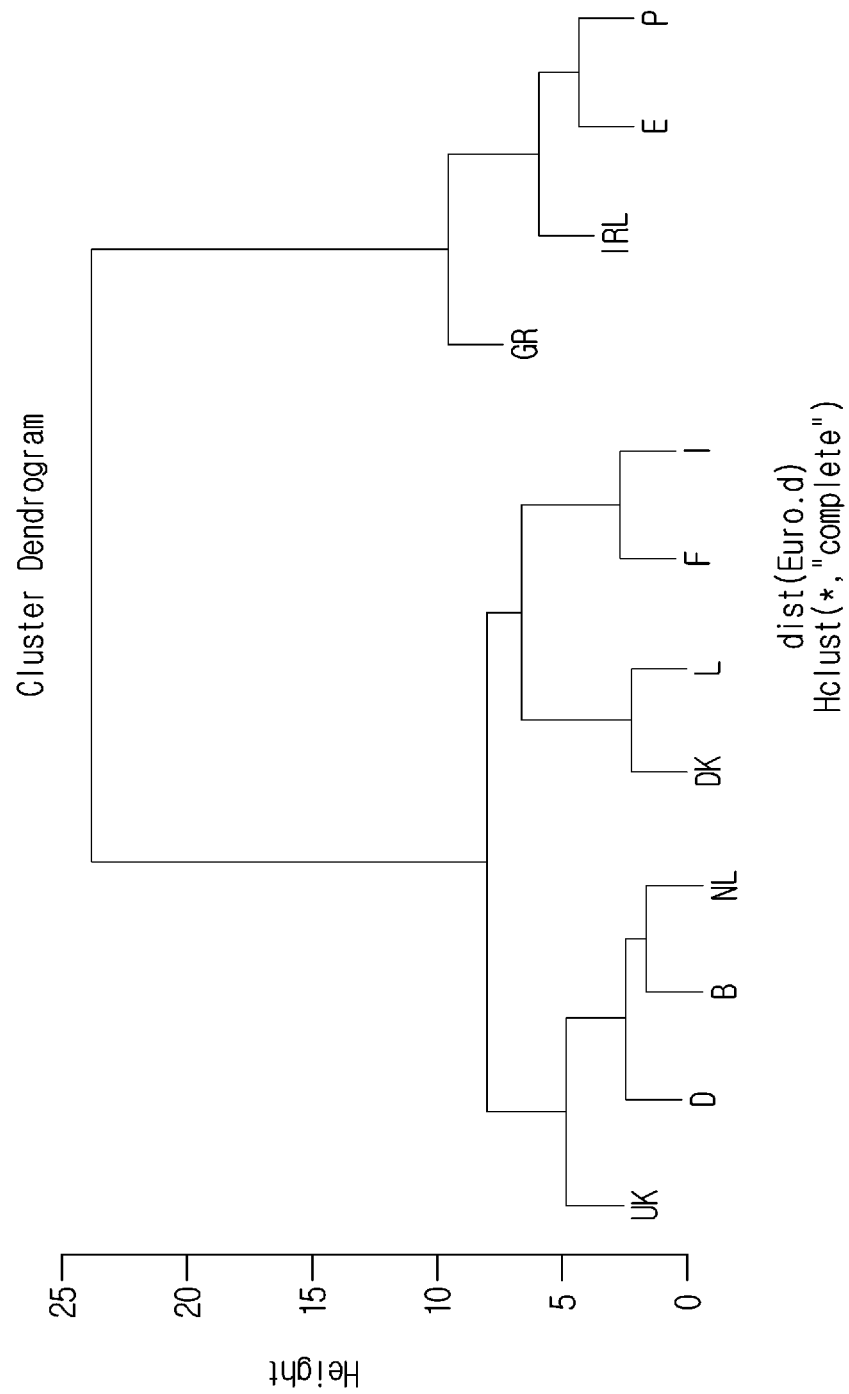
FIG. 12 is a view showing a result of cluster analysis according to a dendrogram that graphically visualizes the result of cluster analysis available for anomaly detection analysis according to an embodiment of the present disclosure.

FIG. 12 is a view showing a result of cluster analysis on a dendrogram according to an embodiment of the present disclosure.

According to the definition of inter-cluster distance, it is possible to use the following 6 inter-cluster linkage methods: 1) single linkage: nearest neighbor, 2) complete linkage: farthest neighbor, 3) average linkage, 4) centroid linkage, 5) Ward linkage, 6) median linkage. Clustering results may be different.

① Single linkage (nearest neighbor) measures a distance between two clusters as a minimum value (shortest distance) among distances that may be obtained by selecting one observation value from each cluster. A shortest distance between two clusters (C1, C2) is defined as inter-cluster distance.

$d(C_1,C_2)=\min\{d(x,y)|x \in C_1, y \in C_2\}$

② Complete linkage (farthest neighbor) sets a distance between two clusters to a maximum value among distances that may be obtained by selecting one observation value from each cluster. That is, an inter-cluster distance is defined by a method of connecting a longest distance between farthest entities among entities of two clusters (C1, C2).

$d(C_1,C_2)=\max\{d(x,y)x \in C_1, y \in C_2|\}$

③ Average linkage sets a distance between two clusters $C_1$ and $C_2$ to an average of distances among all entities belonging the clusters and may be defined as in the following formula.

$$d(C_1, C_2) = \frac{1}{n_1 n_2} \sum_i \sum_j d_{ij}$$

Here, $n_1$ is the number of entities belonging to the group $C_1$, and $n_2$ is the number of entities belonging to the group $C_2$.

④ Centroid linkage uses a method of defining a distance between two clusters $C_1$ and $C_2$ as a distance between the centers of the clusters. When the number of entities belonging to the cluster $C_1$ is $n_1$, the center of the cluster $C_1$ is $x_1$, the number of entities belonging to the cluster $C_2$ is $n_2$, and the center of the cluster $C_2$ is $x_2$, the distance $d(C_1, C_2)$ between the two clusters $C_1$ and $C_2$ is the square of the Euclidean distance between the two centers, which may be defined as follows.

$d(C_1,C_2)=\|\bar{x}_1-\bar{x}_2\|^2$

When the clusters are merged, the center of a new cluster may be obtained using a weighted average as follows.

$$\bar{x} = \frac{n_1 \bar{x}_1 + n_2 \bar{x}_2}{n_1 + n_2}$$

After obtaining a distance between each cluster, data with a closest distance between centers and a new cluster are formed. By repeating this process, a single cluster including all the data is formed.

⑤ Ward linkage is a clustering method of considering similarity between two clusters by an error sum of squares (ESS) when the two clusters are agglomerated. This linkage method performs clustering to minimize loss of information between clusters. Herein, the information between clusters is represented by an ESS, and a within-cluster distance between cluster $C_1$ and cluster $C_2$ is a sum of within-cluster squares, which may be expressed as follows.

$$ESS_{C_i} = \sum_{j=1}^{n_{C_1}} (X_{c_1 j} - \bar{X}_{c_1})'(X_{c_1 j} - \bar{X}_{c_1}) = \sum_{j=1}^{n_{C_1}} \sum_{i=1}^{p} (X_{c_1 j t} - \bar{X}_{c_1 t})^2$$

$$ESS_{C_2} = \sum_{j=1}^{n_{C_2}} (X_{c_2 j} - \bar{X}_{c_2})'(X_{c_2 j} - \bar{X}_{c_2}) = \sum_{j=1}^{n_{C_2}} \sum_{i=1}^{p} (X_{c_2 j t} - \bar{X}_{c_2 t})^2$$

When agglomerating cluster $C_1$ and cluster $C_2$, a sum of within-cluster squares is as follows. Here, X and X are average observation vectors in each cluster. Accordingly, clustering of two clusters C1 and C2 is a linkage method for minimizing an increment of ESS.

⑥ Median linkage is a method of linking two clusters with closest similarity by defining a distance between two clusters $C_1$ and $C_2$ with sizes of n1 and n2 respectively based on the division of the sum of averages of two entities, which belong to each cluster, by 2.

$$d(C_1, C_2) = \frac{(\bar{X}_{C_1} + \bar{X}_{C_2})}{2}$$

Figure 13:
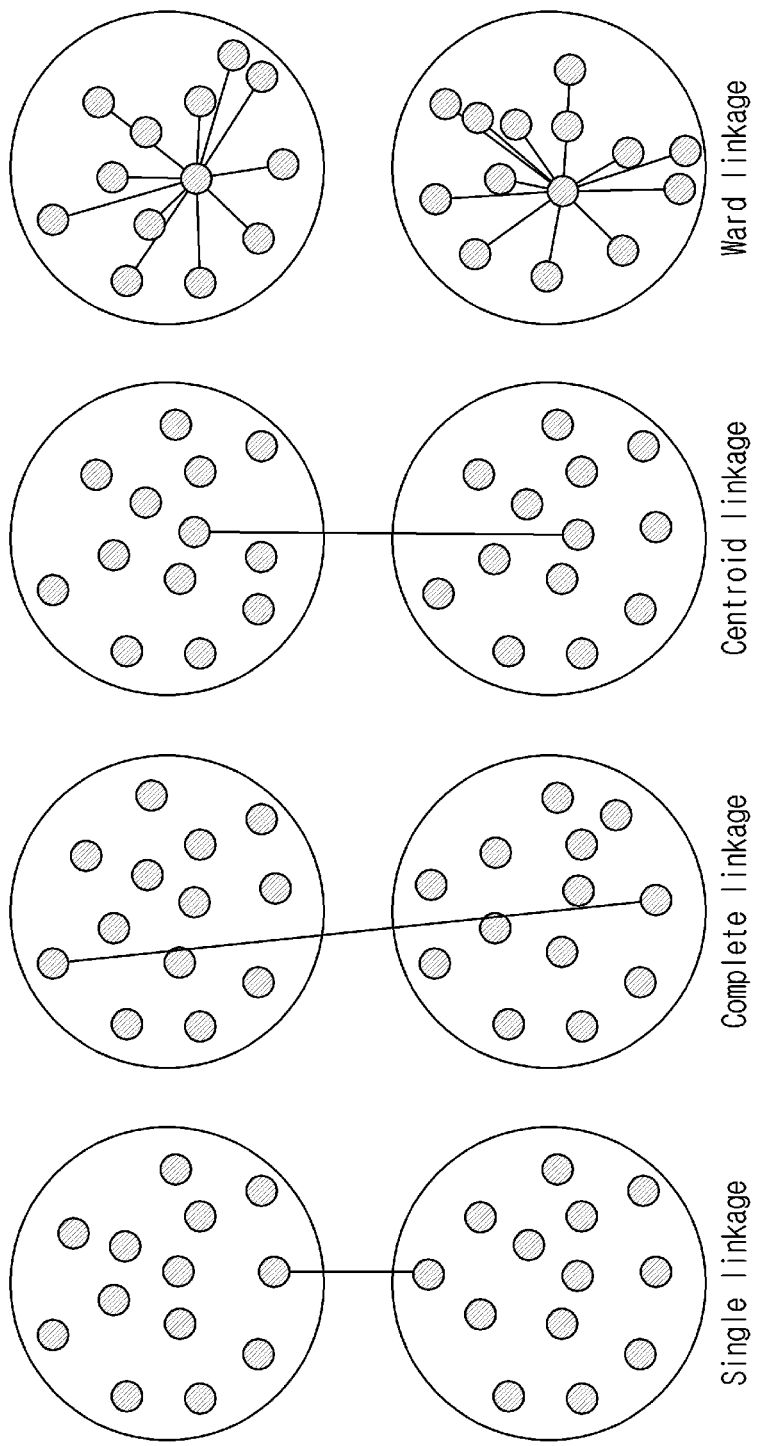
FIG. 13 is a view showing results of four linkage methods of hierarchical cluster analysis according to an embodiment of the present disclosure.
Figure 14:
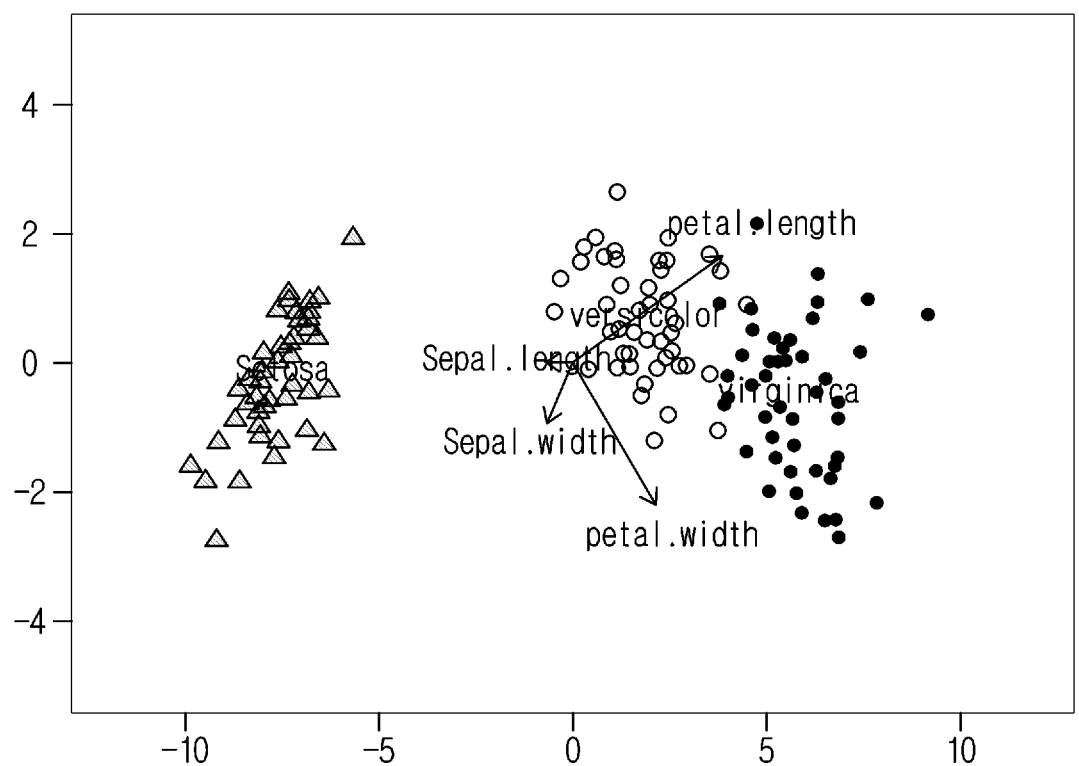
FIG. 14 is a view showing a visualized canonical discriminant analysis according to an embodiment of the present disclosure.

FIG. 13 is a view showing results of 4 linkage methods of hierarchical cluster analysis according to the present disclosure.

(2) Nonhierarchical or Partitioning Method

Nonhierarchical clustering method is also referred to as partitioning method. Nonhierarchical clustering method is a clustering method using an optimal division technique that optimizes a given determination criterion in order to divide observation values into several clusters. Thus, the nonhierarchical clustering method focuses on clustering of entities not clustering of variables. As the nonhierarchical clustering method does not seek a distance matrix, it is not necessary to store all data during a clustering process. Accordingly, in case of an enormous amount of data, the K-means method is used as an appropriate clustering method.

① K-means method is referred to as nonhierarchical method or partitioning method. As a method of dividing all entities into K clusters, unlike the hierarchical clustering method, the K-means method is capable of reallocation, that is, moving an entity from one cluster to another cluster.

As the K-means method depends on an initial seed value, selection of an initial value of cluster has an effect on selection of a final cluster. Accordingly, the final cluster is determined by repeatedly selecting and comparing initial values using several methods. The K-means method is a method of allocating each observation value to a closest cluster among centers of clusters based on the number K of clusters, which is determined to divide all entities into K clusters. The K-means method may be implemented in the following steps.

Step 1: Determine the number of clusters (K) for raw data or standardized data

Step 2: Randomly select focusing on an average of K clusters that are initially determined Step 3: Calculate by selecting one of the calculations for measuring similarity between each entity and between each cluster (Euclidean, Mahalanobis, Standardized, Minkowski, Kanbbera, Chebychev, Manhattan, etc.) and then perform allocation (division) each entity to K clusters based on closest similarity Step 4: Repeat calculation of distance for each entity by recalculating an average of entities allocated to an individual cluster Step 5: Repeat Step 3 and Step 4 until each entity has no change of cluster (3) Method of Testing the Goodness of Fit of Cluster Analysis As most widely applied methods for evaluating the goodness of fit of a result for a clustering method of a cluster analysis, one is a method using a cophenetic correlation coefficient, and the other method uses a Rousseeuw agglomerative coefficient. These methods are capable of evaluating a model for a clustering method of a cluster analysis as regards how faithfully a pair distance between data points appears by a clustering method.

Of the two methods for testing the goodness of fit of a cluster analysis, the method using a cophenetic correlation coefficient first assumes that for raw data $x_1, x_2, \ldots, x_p$, clusters $C_1, C_2, \ldots C_i$ are generated by means of dendrograms using a cluster model selected by clustering methods (6 hierarchical methods and 1 nonhierarchical method) and 7 distance calculation methods.

Herein, a distance $d_{ij}$ is a distance between i-th observation and j-th observation and may generally represent a Euclidean distance, and $C_{ij}$ means a height of a node, in which two points are agglomerated first, as a classification level where the observations i and j are classified as a same cluster for the first time. When a correlation coefficient between $d_{ij}$ and $C_{ij}$ is $\gamma_{ij}$, a formula for a cophenetic correlation coefficient may be expressed as follows.

$$\gamma_{ij} = \frac{\sum_{k<j}(d(i,j)-\bar{d})^2(C(i,j)-\bar{C})}{\sqrt{\left[\sum_{k<j}(d(i,j)-\bar{d})^2\right]\left[\sum_{k<j}(C(i,j)-\bar{C})^2\right]}}$$

As the cophenetic correlation coefficient $\gamma_{ij}$ is closer to 1, a more appropriate cluster analysis method is determined.

A Rousseeuw agglomerative coefficient may be used as another method for testing the goodness of fit of a cluster analysis. A Rousseeuw agglomerative coefficient defines $d_i$ as a value that is obtained by dividing a distance, at which i-th observation forms a group first, by a distance at which an ultimate single cluster is formed, and the corresponding formula is as follows.

$$d_i = \frac{1}{n}\sum_{i=1}^{n}(1-d_i)$$

In the above formula, as the Rousseeuw agglomerative coefficient $d_i$ is closer to 1, a more appropriate cluster analysis method may be determined.

2.2 Abnormal Prediction Analysis-Discriminant Analysis

A second type of abnormal prediction analysis methods may include a discriminant analysis and a classification analysis.

The discriminant analysis is an analysis method that uses information of samples extracted from two or more populations and finds out a criterion for determining from which population these samples are extracted.

This method divides entities observed in a multiplicity of groups (populations), which are already known, according to each group and discriminates each entity by its original population as far as possible. Herein, a distance between each entity and a center (population mean) of group is calculated so that the entity can be discriminated as a nearest group.

2.3 Abnormal Prediction Analysis-Classification Analysis

The classification analysis is a multivariate analysis method for minimizing misclassification. This prediction method classifies a newly observed or included entity into one of a multiplicity of groups that are already known. The discriminant analysis has two or more dependent variables (category type, group). When a new entity is observed and included after performing the discriminant analysis so that entities of each group belong to one group, it is possible to predict which group includes the entity by performing the classification analysis that makes the entity included in any one group.

A representative case of performing a discriminant analysis and a classification analysis in the ICT field is that when the groups of normal traffic and abnormal traffic are already determined for traffic patterns of each network link, new traffic is collected after performing the discriminant analysis for traffic data of each link. In such a case, a prediction may be made by performing a classification analysis that classifies the new traffic into normal traffic or abnormal traffic.

The discriminant analysis and the classification analysis may be performed in a supervised learning algorithm module of artificial intelligence (AI) deep learning (DL) and a statistical analysis algorithm module, which are Included in a firewall against an abnormal traffic behavior like virus invasion and DDoS attack in such physical equipment as network, server, storage, homepage server and email server, and in an integrated security management system for intrusion prevention.

A discriminant analysis is performed when there is already knowledge information that is previously grouped for normal traffic and abnormal traffic. In addition, when there is no grouped information, the above-described cluster analysis is performed to group all entities storing traffic according to flow. Thus, an advance cluster analysis is performed for each entity. However, when collected data of each entity have different units, there is a difference of variation. Accordingly, a cluster analysis is performed after standardization N(0, 1) transform is executed.

The difference between the discriminant analysis and the cluster analysis may be described as follows.

The discriminant analysis is an analysis technique for finding out and identifying variables, which describe a distinctive characteristic among groups, when there is advance information on the groups. Later, when a new entity is applied, a classification analysis is performed to include the entity as one group. On the other hand, the cluster analysis is an analysis for measuring similarity (distance) for each entity and distinguishing each entity according to group, when there is no advance group information for each entity.

A discriminant function is a function of random variables minimizing a probability of being misclassified as a criterion of discrimination or minimizing cost that may occur due to misclassification. On the other hand, a classification function is a function used a criterion of classification for classifying a new sample into any one population among a multiplicity of populations, when the new sample is observed without being known from which population the new sample is extracted. Generally, a discriminant function obtained from a discriminant analysis is used as a classification function.

Hereinafter, the difference between supervised learning and unsupervised learning of AI/deep learning (DL) will be described.

The supervised learning of AI/DL performs an analysis using an algorithm like discriminant analysis, logistic regression analysis and atypical time series analysis as a statistical model.

Accordingly, a supervised learning algorithm of AI/D includes the following elements: a support vector machine (SVM), a hidden Markov model, linear regression, a neural network, naive Bayes classification, a nearest neighbor, decision trees, classification rule learners, regression trees, and model trees.

Unsupervised learning of AI/DL performs an analysis using an algorithm of variable reduction like cluster analysis, factor analysis, principal component analysis and multivariate analysis as a statistical model. In unsupervised learning of AI, an AI/DL algorithm for a statistical multivariate analysis includes the following elements.

Cluster analysis: hierarchical clustering, k-means, mixture models, DBSCAN, OPTICS algorithm, expectation maximization Visualization and dimensionality reduction: Principal Component Analysis(PCA), kernel PCA, Locally-Linear Embedding(LLE), t-SNE distributed Stochastic Neighbor Embedding Association rule learning: Apriori, Eclat Anomaly detection: Local outlier factor Neural network: Autoencoders, Deep Belief Nets, Hebbian Learning, Generative Adversarial Networks, Self-organizing map Blind signal separation techniques: Principal component analysis, Independent component analysis, Non-negative matrix factorization, Singular value decomposition Meanwhile, 'discriminant analysis' is a term conventionally referred to when there are two groups of dependent variables. When there are three or more groups of dependent variables, it is referred to as multiple discriminant analysis. A discriminant analysis applies the following four types of discriminant functions.

① Linear DA: is used when a variance-covariance matrix of a normal distribution is same regardless of groups.

② Quadratic DA: is used when variance-covariance matrices of a normal distribution are different according to groups.

③ Canonical DA: performs a discriminant analysis using a canonical variable that includes every useful information of discriminant variables.

④ K Nearest Neighbor DA: is a non-parametric discriminant analysis method used when a population does not follow a normal distribution.

(1) Linear Discriminant Analysis (LDA)

Among the above analyses, according to LDA, Fisher's linear discriminant function may be applied when a variance-covariance matrix of a normal distribution is same regardless of groups. The theoretical background of LDA is as follows.

Fisher's linear discriminant function

Assume that there are two populations:

$\pi_1 \sim N_p(\mu_1, \Sigma_1)$, Population 1

$\pi_2 \sim N_p(\mu_2, \Sigma_2)$ Population 2

As every discriminant (rule) has a parameter of a population and thus an estimate for the parameter is needed, a population mean ($\mu$) may be used as a sample mean ($\gamma$), and a sample variance-covariance ($\Sigma = S$) may be used as a covariance matrix ($\Sigma$).

Although no assumption is needed for distribution of each group, it is assumed that a covariance matrix is same, and the formula is as follows.

Covariance matrix: $\Sigma = E(X-\mu)(X-\mu)'$

A linear discriminant function converts a multivariate observation x to a univariate observation y by using a linear combination maximizing a distance between populations.

y: as linear combination of observation $x' = (x_1, x_2, \ldots, x_p)$ $y = 1_1 x_1 + 1_2 x_2 + \ldots + 1_p x_p = 1'_x, 1 = (1_1, 1_2, \ldots, 1_p)$ Here, coefficient vector 1 may be determined as follows.

$\mu_{1y}$: mean of y belonging to $\pi 1$ $\mu_{2y}$: mean of y belonging to $\pi 2$ Obtain 1 so as to maximize the distance between $\mu_{1y}$ and $\mu_{2y}$.

That is, let the following ratio be maximized. (Square of distance between sample means of y)/(within-sample variation of y) may be expressed by the following formula.

$$l = \frac{(\bar{y}_1 - \bar{y}_2)^2}{S_y^2} = \frac{(\hat{l}'\bar{x}_1 - \hat{l}'\bar{x}_2)^2}{\hat{l}' S_p \hat{l}} = \frac{(\hat{l}d)^2}{\hat{l}' S_p \hat{l}}.$$

Herein, $d = \bar{x}_1 - \bar{x}_2$, that is, obtain 1 so that the ratio between a within-sample variation and a between-sample variation is maximized.

When $\mu_i$ (population mean) and $\Sigma$ (covariance matrix) are not known, Fisher's sample discriminant function is expressed by the following formula.

$$y = \hat{l}'x = (\bar{x}_1 - \bar{x}_2)' S_p^{-1} x, \bar{x}_i = 1/n_i \sum_{i=1}^{n} x_{ij},$$

Here, i=1, 2 means a sample mean, and $S_p$ is a pooled estimator of $\Sigma$, which can be expressed by the following formula.

$$S_p = \frac{(n_1 - 1)S_1 + (n_2 - 1)S_2}{n_1 + n_1 - 2}$$

Hereinafter, types of classification analysis will be described.

① Classification method using Fisher's discriminant function

Classification reference point of a classification method using Fisher's discriminant function: a median of $\mu_{1y}$ and $\mu_{2y}$ is used, which can be expressed by the following formula.

$m = \frac{1}{2}(\mu_{1y} + \mu_{2y}) = \frac{1}{2}(l'\mu_{1y} + l'\mu_{2y}) = \frac{1}{2}(\mu_1 - \mu_2)'\Sigma^{-1}(\mu_1 + \mu_2)$ Formula of a classification reference point in a sample is as follows.

$$\hat{m} = 1/2(\bar{y}_1 + \bar{y}_2) = 1/2(\bar{x}_1 - \bar{x}_2)'S_p^{-1}(\bar{x}_1 + \bar{x}_2)$$

That is, when a new entity is given, $y_0 = (\bar{x}_1 - \bar{x}_2)'S^{-1}_p x_0$ may be calculated and compared with a median and the entity may be classified by the following criterion.

If $y_0 \geq \hat{m}$, classify into group $\pi_1$.
If $y_0 \leq \hat{m}$, classify into group $\pi_2$.

② Classification method by a discriminant function using prior probability information Formula of a classification reference value using prior probabilities of two populations $\pi_1$ and $\pi_2$ of $p_1$ and $p_2$ is as follows.

$$\hat{m} = \frac{1}{2}(\bar{x}_1 - \bar{x}_2)'S_p^{-1}(\bar{x}_1 + \bar{x}_2) + \ln\frac{p_2}{p_1}$$

That is, as $p_1$ is greater than $p_2$, the value of $\hat{m}$ decreases. Accordingly, an entity is more likely to be classified into group $\pi_1$ to which it belongs.

③ Classification method by Mahalanobis distance function

When a population has a same variance-covariance matrix ($\Sigma$), a likelihood function rule may be as follows. If $d_1 < d_2$, classify into group m. Otherwise, classify into $\pi_2$. The Mahalanobis distance formula may be as follows.

$$d_i = (\underline{x}_0 - \underline{\mu}_i)'\Sigma^{-1}(\underline{x}_0 - \underline{\mu}_i), i = 1,2$$

④ Logistic regression classification method using posterior probability

The classification method by logistic regression using a posterior probability rule may apply a logistic regression method when variables used to obtain a classification function are quantitative variables or categorical variables (variables having values of 0 and 1).

$$\log it(p) = \ln(\text{odds}) = \ln\left(\frac{p}{1-p}\right) = \beta_0 + \beta_1 Z$$

$$\theta(Z) = \left(\frac{p(Z)}{1 - p(Z)}\right) = \exp(\beta_0 + \beta_1 Z)$$

$$p(Z) = \frac{\exp(\beta_0 + \beta_1 Z)}{1 + \exp(\beta_0 + \beta_1 Z)};$$

This is a logistic curve, and a formula of logistic regression may be as follows.

$$\ln\left(\frac{p(Z)}{1 - p(Z)}\right) = \hat{\beta}_0 + \hat{\beta}_1 Z_1 + \cdots + \hat{\beta}_r Z_r = \hat{\beta} Z_i, \beta = [\beta_0, \beta_1, \cdots, \beta_r]'$$

and a classification method by logistic regression may be as follows.
when $$\ln\left(\frac{\hat{p}(Z)}{1 - \hat{p}(Z)}\right) = \hat{\beta}_0 + \hat{\beta}_1 Z_1 + \cdots + \hat{\beta}_r Z_r = \hat{\beta} Z_j > 0,$$

Z may be classified into the population group $\pi_1$.

When a population has a same variance-covariance matrix (E) and a posterior probability p of population group $\pi_1$ is $p(\pi_1|\underline{x}_0) > p(\pi_2|\underline{x}_0)$, it may be classified into group $\pi_1$. Otherwise, it may be classified into $\pi_2$.

Homoscedasticity testing for a linear discriminant analysis (LDA) may be performed by the following method.

As LDA is a method that is applied when a variance-covariance matrix of a normal distribution is same regardless of groups, the homoscedasticity assumption should be tested. Accordingly, homoscedasticity testing is performed by Box-M test.

$$\text{Hypothesis:} \begin{cases} H_0: \Sigma_1 = \Sigma_2 = \cdots = \Sigma_k \\ H_1: \Sigma_1 \neq \Sigma_2 \neq \cdots \neq \Sigma_k \end{cases}$$

Test statistics: Box-M statistics are as follows.

$$M = \begin{cases} (n-k)\ln|S| - \sum_{i=1}^{k}(n_i - 1)\ln|S_i| & \text{if } |S| > 0 \\ \text{sysmis} & \text{if } |S| \leq 0 \end{cases}$$

Box-M test is a test method performed under assumption that a covariance matrix is same between groups (homogeneity test of variance). For example, when p-value is greater than a significance level of 0.05, it is determined that a covariance matrix is same. When p-value is less than the significance level of 0.05, the null hypothesis is rejected and it may be determined that the covariance matrix is not same.

When homoscedasticity assumption for a linear discriminant analysis is not satisfied, normal transformation is performed and then the sameness of covariance matrix is tested again. In addition, when homoscedasticity is same regardless of distribution type, a linear discriminant function is used. When homoscedasticity is different, a quadratic discriminant function is applied.

(2) Quadratic Discriminant Analysis (QDA)

QDA is a method applied when two populations have different covariance matrices ($E_1 \neq E_2$).

The formula of quadratic classification function for QDA is as follows.

$$-1/2x_0'(\Sigma_1^{-1} - \Sigma_2^{-1})x_0 - (\mu_1'\Sigma_1^{-1} - \mu_2'\Sigma_2^{-1})x_0 - k \geq \ln\left[\left(\frac{C(1|2)}{C(2|1)}\right)\left(\frac{P_2}{P_1}\right)\right]$$

When the above formula is satisfied, $x_0$ may be classified into group $\pi_1$, and otherwise, may be classified into group $\pi_2$ However, $$k = \frac{1}{2}\ln\left(\frac{|\Sigma_1|}{|\Sigma_2.|}\right)\frac{1}{2}(\mu_1'\Sigma_1^{-1}\mu_1 - \mu_2'\Sigma_2^{-1}\mu_2),$$

which indicates high sensitivity to normality assumption.

When normality assumption is not satisfied, normal transformation is performed and then the sameness of covariance matrix is tested again. In addition, as normal transformation has been performed, an analysis may be performed using a linear discriminant function.

(3) Canonical Discriminant Analysis (CDA)

Proposed by Fisher, CDA is also referred to as Fisher's between-within method. CDA performs a discriminant analysis using a canonical variable including every useful information of discriminant variables. This is a discriminant analysis method that processes and transforms cluster means of entities in a p-dimensional space into a low-dimensional space when the number (p) of discriminant variables is too large for interpretation of a discriminant result.

As CDA does not aim at entity classification but aims to express an entity classification interpretation in a low dimension (box-plot, scatter plot), it is not a discriminant analysis, strictly speaking.

That is, CDA has an advantage of reducing and visualizing an actual distance between clusters to a low dimension.

The formula of quadratic classification function for QDA is as follows.

$$-1/2x_0'(\Sigma_1^{-1} - \Sigma_2^{-1})x_0 - (\mu_1'\Sigma_1^{-1} - \mu_2'\Sigma_2^{-1})x_0 - k \geq \ln\left[\left(\frac{C(1|2)}{C(2|1)}\right)\left(\frac{P_2}{P_1}\right)\right]$$

FIG. 8 is a view visualizing a canonical discriminant analysis according to an embodiment of the present disclosure.

(4) K-Nearest Neighbor Discriminant Analysis

K-nearest neighbor or K-NN is a nonparametric method applying a classification or regression model. K-NN is different according to whether it is applied to a classification model or a regression model.

In a discriminant analysis model applying K-NN, an object is allocated to a most common item among k nearest neighbors and may be classified by majority (k is a positive integer and is usually a small number). When k=1, an object is simply allocated to an item of one nearest neighbor.

In a regression analysis applying K-NN, an output is an attribute value of an object. This value may be an average of values of k nearest neighbors.

K-NN algorithm is a machine learning algorithm of AI. Also, K-NN algorithm is not related to an algorithm of K-means method of cluster analysis.

K-nearest neighbor classification (KNNC) method is a nonparametric discriminant analysis used when a population does not follow normal distribution. This method classifies each entity into a group with highest frequency among groups of k nearest neighbors of the entity in a discriminant classification analysis for multivariate data composed of a plurality of continuous variables (discriminant variables) correlating with each other and response variables representing each group.

Obtain an entity with shortest Mahalanobis distance from an entity to be classified and classify the latter entity into a group to which the former entity belongs.

When there are two entities with same distance and they belong to a same group, classify into the group.

When there are two entities with same distance and they belong to different groups, investigate a group of a second nearest entity and then classify into a group to which a majority of entities belong among the three entities. That is, the K-NN method is a method of considering nearest k entities with shortest Mahalanobis distance and classifying into a cluster occupied by a largest number of entities among clusters of the k entities.

2.4 Abnormal Prediction Analysis—Classification Analysis

The KNNC method, which is a nonparametric discriminant classification method, is incapable of reflecting a local feature of data since it uses the number of neighbors but not utilizing information of a group variable.

The adaptive nearest neighbors classification (ANNC) method and the modified adaptive nearest neighbors classification (MANNC) method are new methods proposed to improve the disadvantages of the KNNC discriminant and the modified k-nearest neighbors classification (MKNNC) method respectively.

(1) Modified Adaptive Nearest Neighbors Classification (MANNC)

The MANNC method is a method capable of enhancing statistical efficiency since it has the following two advantages at the same time: modifying k, the number of nearest neighbors used to determine a group according to each entity by considering a local feature of the entity; utilizing information of group that is already known.

The MANNC method is implemented in five steps as follows.

Step 1: calculate validity V(i) (i=1, 2, . . . , n) for each entity.

Step 2: obtain a new distance $d^\delta_{ij}=d_{ij}+\delta$, that is, the addition of a distance between entities $d_{ij}$ (i, i=1, 2, . . . , n) and tuning parameter $\delta$.

Step 3: obtain an approximation scale matrix W with n×n size by using the tuned distance $d^\delta_{ij}$ and the validity.

Here, W may be obtained as follows.

$$W = (w_{ij}) = \left(V_j \times \frac{1}{d^\delta_{ij}}\right), i, j = 1, 2, \cdots, n.$$

Step 4: determine a threshold value q and determine a neighbor group N(i) composed of entities having a reduction ratio between largest approximation $w_{i(1)}$ to entity $x_i$ (i=1, 2, . . . , n) and $w_{ij}$ (i≠j) equal to or greater than q.

$$N(i) = \left(x_j : \frac{w_{ij}}{w_{i(1)}}\right), 0 < q \leq 1.$$

Step 5: classify $x_i$ (i=1, 2, . . . , n) into a group, which is observed most frequently, among entities belonging to the neighbor group N(i).

The main difference between the ANNC method and the MANNC method consists in the step 3. That is, when measuring approximation between entities, the ANNC method depends only on a distance $d_{ij}$ between entities, while the MANNC method is capable of using group information of entities through validity (V(i), i=1, 2, . . . , n).

Step 4 may reflect a local feature including density or structure surrounding an entity by selecting entities, which have an approximation reduction ratio to the entity equal to or greater than threshold value q, as neighbors when selecting entities with high approximation between entities.

Herein, when q is a large number, a small number of entities are selected as neighbors. When q is a small number, a large number of entities are selected as neighbors. However, when selecting neighbors of an entity, if a distance $d_{ij}$ used for largest approximation $w_{i(1)}$ to the entity is close to 0, the approximation reduction ratio $w_{i(2)}/w_{i(1)}$ of a second nearest entity increases to infinity. Accordingly, the tuning parameter $\delta$ for the distance $d_{ij}$ is used in step 2, and a median value of a distance matrix may be used. Thus, the MANNC method may perform a better classification analysis using validity (V(i), i=1, 2, . . . , n) and tuning parameter $\delta$ for distance $d_{ij}$.

Figure 15:
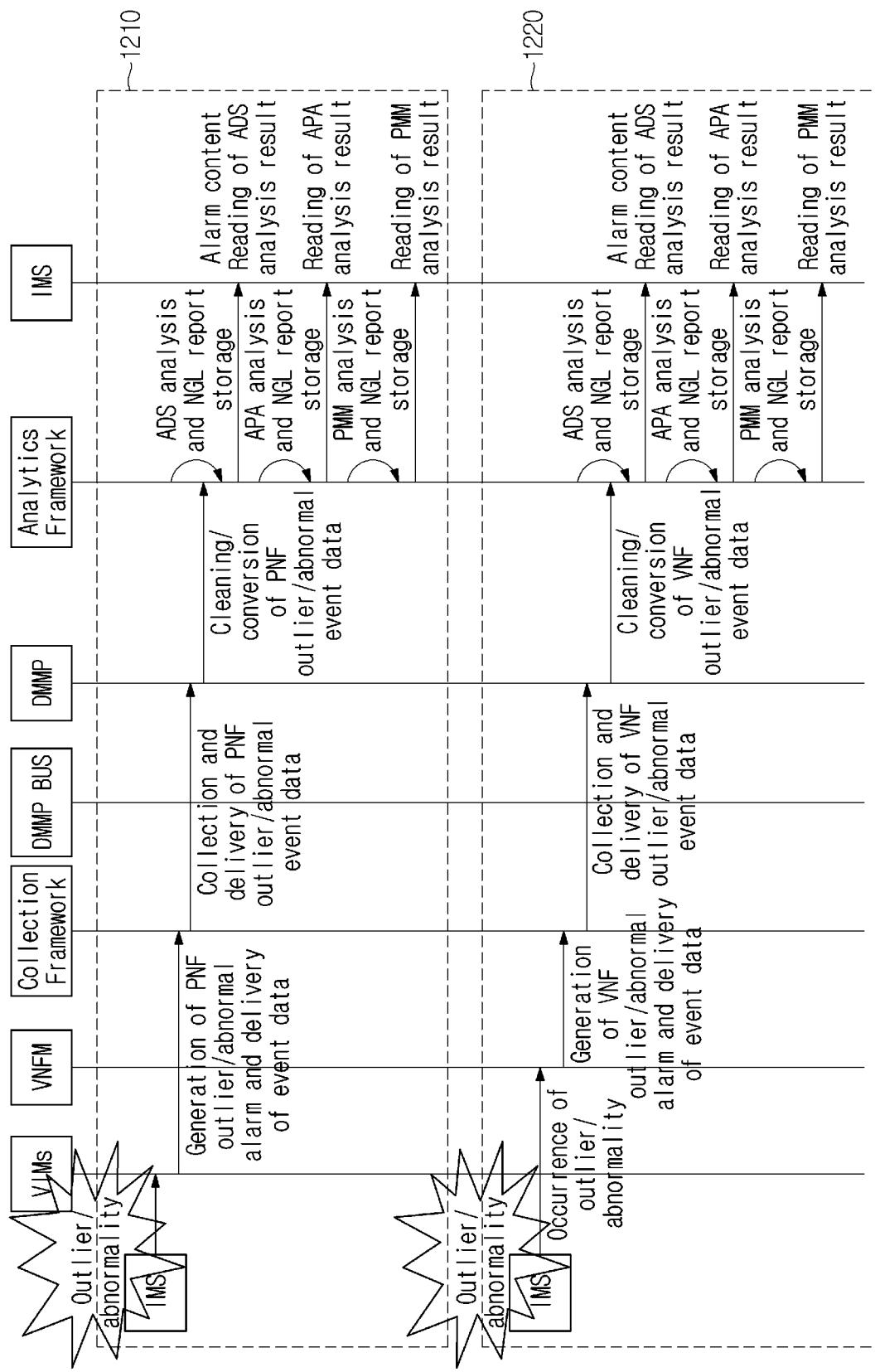
FIG. 15 is a view showing an automation process of an intelligent operation method according to an embodiment of the present disclosure.

FIG. 15 is a view showing an automation process of an intelligent operation method according to an embodiment of the present disclosure. In one embodiment, the intelligent operation management method of FIG. 15 may be implemented by an intelligent operation management apparatus of infrastructure. In another embodiment, the intelligent operation management method may be implemented in an intelligent operation management system including an intelligent operation management apparatus of infrastructure and an operation target, which may correspond to the embodiments of FIG. 1 and FIG. 2. However, this is merely one embodiment and does not limit the present disclosure.

In one embodiment, an intelligent operation management method 1210 of infrastructure for PNF and an intelligent operation management method 1220 of infrastructure for VNF may be implemented independently in an intelligent operation management system or apparatus. Also, although FIG. 12 illustrates that the intelligent operation management method 1210 of infrastructure for PNF is generated earlier than the intelligent operation management method 1220 of infrastructure for VNF, this aims at the clarify of explanation and does not limit the present disclosure. Accordingly, the two methods 1210 and 1220 may be performed simultaneously or be performed in a different order.

In one embodiment, an operation flow of automated process is illustrated including outlier detection for PNF (physical hardware) and VNF (virtualization), which is performed by DCAF, collection of big data related to outlier notification, outlier analysis, anomaly prediction analysis, natural language generation, storage of a report about augmented analytics including natural language and graphs of prediction results, notification of the report to an operator, and a follow-up maintenance method.

In one embodiment, an automated process 1210 of an intelligent operation management method of infrastructure for integrated pre-maintenance for PNF may include outlier detection for PNF (physical hardware), which is performed by DCAP, collection of big data related to outlier notification, outlier analysis, abnormal prediction analysis, natural language generation (NLG), storage of a report about augmented analytics (AA) including natural language and graphs of prediction analysis results, notification of the report to an operator, and a follow-up maintenance method.

In addition, an automated process 1220 of an intelligent operation management method of infrastructure for integrated pre-maintenance for VNF may include outlier detection for VNF (physical hardware), which is performed by DCAP, collection of big data related to outlier notification, outlier analysis, abnormal prediction analysis, natural language generation (NLG), storage of a report about augmented analytics (AA) including natural language and graphs of prediction analysis results, notification of the report to an operator, and a follow-up maintenance method.

In this case, the report based on NLG may include a report on ADA, APA and PMM analysis results, and a detailed process may be the same as what is described with reference to a view above.

Figure 17:
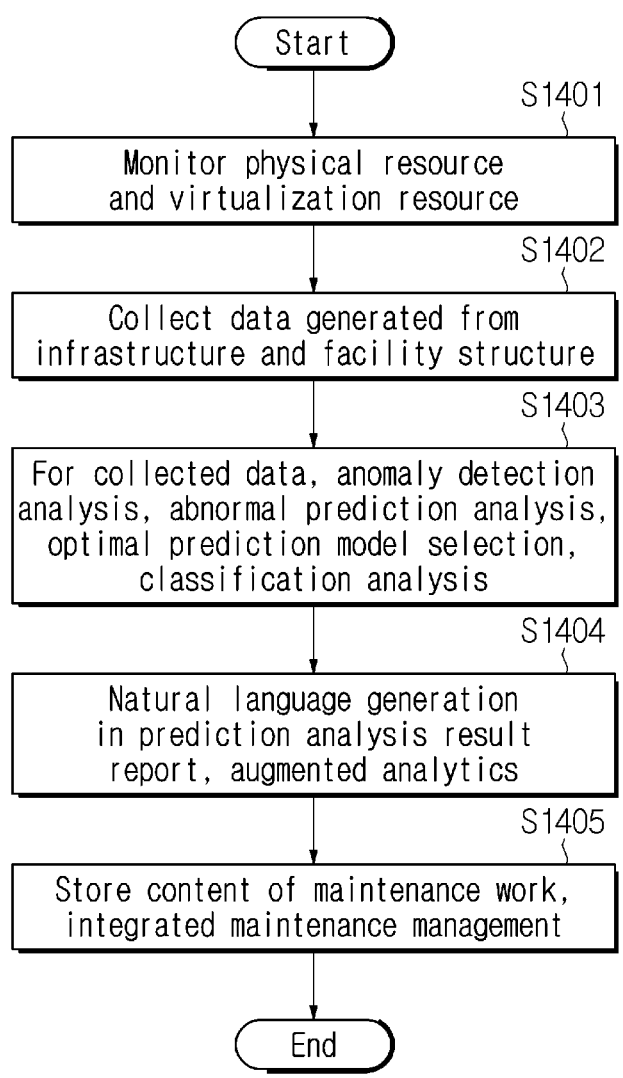
FIG. 17 is a view showing a flow of an intelligent operation method according to an embodiment of the present disclosure.

FIG. 16 is a view showing a flow chart of an intelligent operation method according to an embodiment of the present disclosure, and FIG. 17 is a view showing a flow of an intelligent operation method according to an embodiment of the present disclosure.

The intelligent operation methods of FIG. 16 and FIG. 17 may be implemented by an intelligent operation management apparatus of infrastructure or an intelligent operation management system including an intelligent operation management apparatus of infrastructure and an operation target. In one embodiment, an intelligent operation management apparatus of infrastructure may be the same as described with reference to FIG. 18 below but is not limited thereto.

In one embodiment, the flow charts of FIG. 16 and FIG. 17 may become a hyperautomated process.

In one embodiment, based on DMMP (S1301), operation-related big data may be collected which occur during the operation of an operation target. The big data may be collected (S1402) by monitoring (S1401) in a physical dimension and in a dimension of virtualization. The data thus collected may include data necessary for resource management, and the resource may include a computing device, a storage, a server, and a network. In this case, the operation target and the DMMP may be the same as what is described in FIG. 1 above.

Next, based on data collected from the operation target, an analysis may be performed. Such an analysis may include anomaly detection analysis, abnormal prediction analysis, optimal prediction model selection, and classification analysis (S1403). Also, an analysis of the collected data may be an analysis of abnormal data (S1302). The analysis may be performed based on an analysis framework (AF) and may include TCA, ADA and RCA (S1303). Descriptions of the analysis framework, abnormal data or analysis may be the same as what is described above with reference to another view.

Next, an APA application model is selected (S1304), and an analysis of APA model may be performed according to the selected application model (S1305). This may be included in a step (S1403) of anomaly detection analysis, abnormal prediction analysis, optimal prediction model selection, and classification analysis for the collected data. In one embodiment, an abnormal prediction analysis may be performed based on an analysis method including a cluster analysis, a discriminant analysis, and a classification analysis. In one embodiment, the cluster analysis may be based on a hierarchical cluster model and a nonhierarchical cluster model. This may be the same as described above.

When the APA model analysis is performed, the goodness of fit of the APA model may be tested (S1306). This may be included in a step (S1403) of anomaly detection analysis, abnormal prediction analysis, optimal prediction model selection, and classification analysis for the collected data. As an appropriate APA model, a model, and an analysis method may all be different depending on a feature of collected data, after performing APA model analysis, it is possible to test whether the APA analysis method selected above is suitable or not. According to a result of APA model analysis, prediction statistics, model determination statistics and the like may be visualized so as to be provided in the form of a result report through graph and/or natural language generation. This may be the same as described above. Meanwhile, in this case, if a model of APA is tested as not suitable, another APA model may be selected, and the APA model analysis may be performed again based on supervised learning or unsupervised learning. This may be performed until the goodness of fit of APA model has been tested, which is the same as described above.

When the goodness of fit of APA model, the adequacy of assumption of an application model may be examined (S1307). This process may be included in a step (S1403) of anomaly detection analysis, abnormal prediction analysis, optimal prediction model selection, and classification analysis for the collected data. Meanwhile, anomaly detection analysis and abnormal prediction analysis may be used to include the meanings of optimal prediction model selection and classification analysis. Also, in this case, when the assumption is determined not adequate, the following process may be repeated: selecting another APA model (S1304), analyzing the APA model (S1305), testing the adequacy of the APA model (S1306), and examining the assumption of the application model (S1307). Meanwhile, when the adequacy of the assumption of the application model is recognized, the classification analysis (S1303) may be performed. The classification analysis (S1303), which is an analysis for distinguishing normal traffic and abnormal traffic, may correspond to classification for including a new entity in a normal traffic group or an abnormal traffic group. This may be performed based on measurement of similarity or distance for each entity, which is the same as described above.

Based on a classification analysis result, a graph may be created, and natural language may be generated (S1309, S1404) along with such a graph. Natural language generation may be based on a natural language process (NLP) by automation, which may be the same as described above.

After every step of process is autonomously implemented in the form of report including natural language and a graph that are generated by an automated process, augmented analytics (AA) may be automatically performed (S1310, S1404), and a result of AA may be produced in a report form, which may then be automatically notified to an operator. When performing pre-maintenance management, it may be performed based on a command related to automated process, which implements pre-maintenance management by using history data of abnormal traffic for software error, hardware fault or failure that are applicable to each operation target. Next, pre-maintenance management (S1311, S1404) may be performed including storing and managing (S1404) data of repair time and other maintenance results in a storage or a memory. This may be the same as described above.

According to the present disclosure, as a prediction result report for pre-maintenance management may be notified so that a suitable action for maintenance and a repair work may be implemented before the occurrence of failure, the failure of an operation target may be prevented and the quality of service (QoS) may be ensured.

Figure 18:
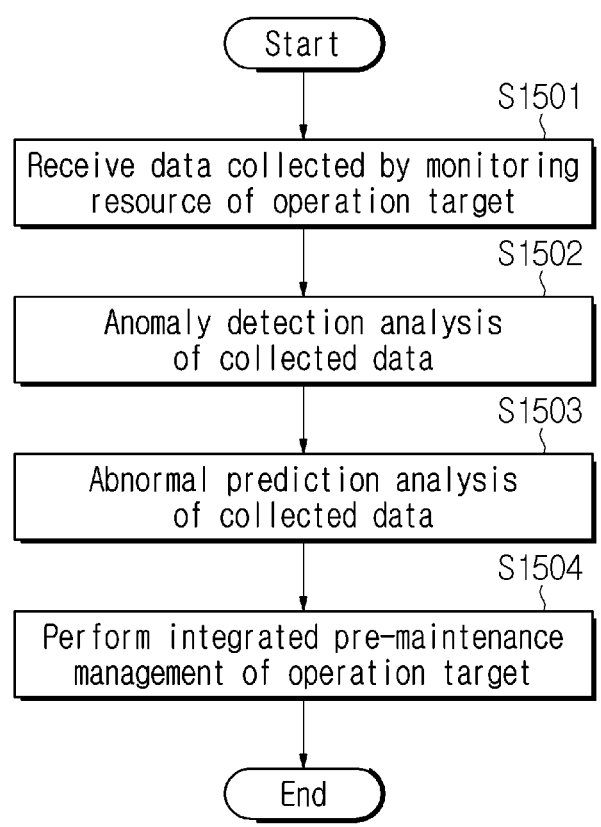
FIG. 18 is a view showing an intelligent operation method by an abnormal traffic (entity) prediction analysis according to an embodiment of the present disclosure.

FIG. 18 is a view showing a flow of a method for intelligent operation management of infrastructure, in which an anomaly detection analysis is performed for collected data and abnormal traffic (object) is predicted, according to another embodiment of the present disclosure. The intelligent infrastructure operation method of FIG. 18 may be implemented by an intelligent operation management apparatus of infrastructure or an intelligent operation management system including an intelligent operation management apparatus of infrastructure and an operation target. In addition, an intelligent operation management apparatus, which is described with reference to the above view and FIG. 16 below, may implement the intelligent infrastructure operation management method of FIG. 18 but is not limited thereto.

Unlike the embodiments of FIG. 16 and FIG. 17, in this embodiment, monitoring of a resource of an operation target may be performed by another external device or operation target, and an intelligent operation management apparatus or system of infrastructure, which implements the method of FIG. 18, may receive (S1501) data collected by monitoring. A resource may include a physical resource and a virtualization resource. However, also in this case, it is obvious that monitoring of a resource of an operation target may be performed to collect data.

When collected data are received, for pre-failure prediction, an anomaly detection analysis (ADA) of the collected data may be performed (S1502), and an abnormal prediction analysis (APA) may be performed (S1503). Such a process may include TCA, ADA, RCA and may also include selection of an APA application model, a model analysis, testing of the goodness of fit of APA model, examination of application model assumption, and a classification analysis.

Through a report including natural language and a graph that are generated based on the analysis result, pre-maintenance management for an operation target may performed (S1504). Herein, augmented analytics through natural language generation may be performed for the analysis result report, and such an augmented analytics result may be provided to an operator. The pre-maintenance management of this step (S1504) may include storage and management of data of repair time and other maintenance results. Accordingly, integrated management of pre-maintenance works becomes possible.

Unless inconsistent with the content of FIG. 18, the same description as that of FIGS. 1 to 17 may be applied to each step included in the embodiment of FIG. 15.

Figure 19:
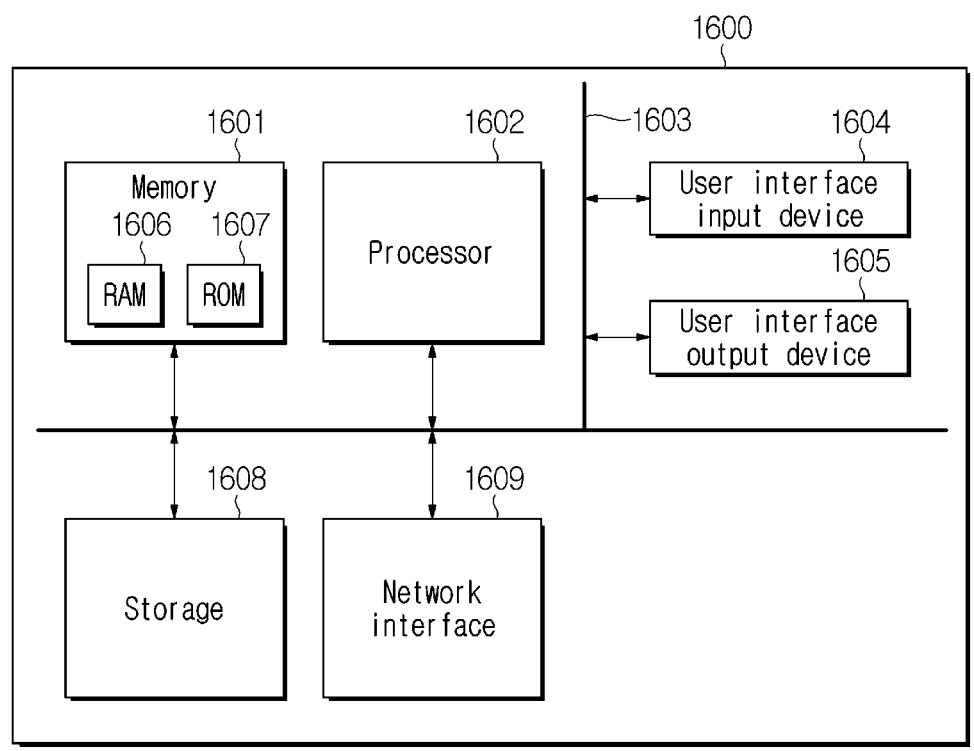
FIG. 19 is a view showing an intelligent operation apparatus according to an embodiment of the present disclosure.

FIG. 19 is a view showing an intelligent operation management apparatus of infrastructure according to an embodiment of the present disclosure. More particularly, FIG. 19 is a block diagram showing a method and apparatus for intelligent operation management of infrastructure and a computing system for implementing the method and apparatus for intelligent operation management of infrastructure according to an embodiment of the present disclosure.

Referring to FIG. 19, a computing system 1600 may include at least one processor 1602, a memory 1601, a user interface input device 1604, a user interface output device 1605, a storage 1608, and a network interface 1609, that are connected via a bus 1603.

The processor 1600 may be a semi-conductor device executing the processing of commands stored in a central processing unit (CPU) or the memory 1601 and/or the storage 1608. The memory 1601 and the storage 1608 may include various types of volatile or non-volatile storage media. For example, the memory 1601 may include a read only memory (ROM) and a random access memory (RAM).

Accordingly, steps of a method or an algorithm described in relation to embodiments of the present disclosure may be directly implemented by hardware, which is executed by the processor 1600, a software module, or a combination of these two. A software module may reside in a storage medium (that is, the memory 1601 and/or the storage 1608) like RAM, flash memory, ROM, EPROM, EEPROM, register, hard disk, removable disk, and CD-ROM. An exemplary storage medium is coupled with the processor 1600, and the processor 1600 may read information from a storage medium and may write information into a storage medium. In another method, a storage medium may be integrated with the processor 1600. A processor and a storage medium may reside in an application-specific integrated circuit (ASIC). An ASIC may reside in a user terminal. In another method, a processor and a storage medium may reside in a user terminal as individual components.

Although the exemplary methods of the present disclosure are represented by a series of acts for clarity of explanation, they are not intended to limit the order in which the steps are performed, and if necessary, each step may be performed simultaneously or in a different order. In order to implement a method according to the present disclosure, the illustrative steps may include an additional step or exclude some steps while including the remaining steps. Alternatively, some steps may be excluded while additional steps are included.

According to the present disclosure, an apparatus and method for active intelligent operation management of infrastructure, which minimizes an operator's decision-making, may be expected.

According to the present disclosure, more stable and continuous provision of application services may be expected by automatically finding an outlier and abnormal traffic, which occur to datacenter infrastructure, and automatically predicting and analyzing abnormal traffic and services.

According to the present disclosure, operation management efficiency may be sought by implementing integrated management through infrastructure failure pre-prediction, anomaly detection analysis and abnormal prediction analysis, and reduction of operating expense may be expected.

Effects obtained in the present disclosure are not limited to the above-mentioned effects, and other effects not mentioned above may be clearly understood by those skilled in the art from the following description.

According to an embodiment of the present disclosure described above, since big data are collected in an intelligent monitoring system (IMS) for operating a datacenter infrastructure (computer, storage, network), ADS, APA and PMM are periodically performed, and a prediction result report including pre-failure prediction, abnormality prediction, NLG, AA and pre-maintenance management is notified, a maintenance work (measure (repair)) is performed before occurrence of failure and thus the failure of infrastructure may be prevented.

In addition, as fault/failure is estimated/predicted/forecast beforehand through anomaly detection analysis and abnormality prediction of infrastructure and an event (fault/failure) is recognized and an action (repair work) is taken, the quality of application services may be constantly ensured by pre-failure prevention of infrastructure.

The various embodiments of the disclosure are not intended to be all-inclusive and are intended to illustrate representative aspects of the disclosure, and the features described in the various embodiments may be applied independently or in a combination of two or more.

In addition, the various embodiments of the present disclosure may be implemented by hardware, firmware, software, or a combination thereof. In the case of hardware implementation, one or more application specific integrated circuits (ASICs), digital signal processors (DSPs), digital signal processing devices (DSPDs), programmable logic devices (PLDs), field programmable gate arrays A general processor, a controller, a microcontroller, a microprocessor, and the like may be used for implementation.

The scope of the present disclosure includes software or machine-executable instructions (for example, an operating system, applications, firmware, programs, etc.) that enable operations according to the methods of various embodiments to be performed on a device or computer, and a non-transitory computer-readable medium in which such software or instructions are stored and are executable on a device or computer.

It will be apparent to those skilled in the art that various substitutions, modifications and changes are possible are possible without departing from the technical features of the present disclosure. It is therefore to be understood that the scope of the present disclosure is not limited to the above-described embodiments and the accompanying drawings.

What is claimed is:

1. An intelligent operation management device for infrastructure, the intelligent operation management device comprising:
   a memory; and a processor,
   wherein the processor comprises a data collection analytics platform (DCAP) module that is configured to collect data by monitoring a resource of an operation target, to perform an anomaly detection analysis of the collected data by a real-time visualization method, to perform an abnormal prediction analysis looking for abnormal traffic by applying the collected data, and to perform pre-operation management of the operation target based on a result according to the anomaly detection analysis and a result according to the abnormal traffic prediction analysis,
   wherein the pre-operation management comprises predicting an outlier, an abnormal fault and a failure of the operation target by using history data of a software error and a fault or failure of hardware of the operation target.

2. The intelligent operation management device of claim 1, wherein the DCAP module is further configured to express a report for a result of the anomaly detection analysis and a result of the abnormal traffic prediction analysis by means of a graph and natural language that is generated for analysis result interpretation.

3. The intelligent operation management device of claim 2, wherein the analysis result report is configured to perform augmented analytics based on the generated natural language by applying an analytics framework (AF) to the DCAP module.

4. The intelligent operation management device of claim 1, wherein the anomaly detection analysis is configured to determine, by applying a data movement management platform (DMMP) module to the DCAP module, whether or not the collected data have at least one anomaly among a point anomaly, a collective anomaly and a contextual anomaly, based on a graphical visualization method.

5. The intelligent operation management device of claim 4, wherein the anomaly is based on detection of an outlier using at least one, as a graphical visualization method, among a scatter plot, a box plot, a box-and-whisker plot, a notched box whisker plot, a timeseries plot, a histogram, a stem & leaf plot, and a control chart, by applying an anomaly detection analysis system (ADAS) module to the DCAP module.

6. The intelligent operation management device of claim 1, wherein the prediction analysis is configured to perform, by applying an abnormal prediction analysis system (APAS) module to the DCAP module, a cluster analysis, which is performed for abnormal traffic in a state where no information on abnormal traffic exists in advance, a discriminant analysis, which is performed for abnormal traffic in a state where information on a group exists in advance, and a classification analysis for determining and classifying abnormal traffic for a new sample.

7. The intelligent operation management device of claim 6, wherein the discriminant analysis is configured to perform, by applying an analytics framework (AF) to the DCAP module, at least one discriminant analysis among a linear discriminant analysis, a quadratic discriminant analysis, a canonical discriminant analysis, and a K-nearest neighbor (KNN) discriminant analysis.

8. The intelligent operation management device of claim 6, wherein the classification analysis, by applying a data movement management platform (DMMP) module to the DCAP module, is at least one among a classification analysis by Fisher's discriminant function, a classification analysis by a discriminant function using prior probability information, a classification analysis by a distance function, and a logistic regression classification analysis by a posterior probability.

9. The intelligent operation management device of claim 1, wherein the predicting of an abnormal traffic fault and failure of the operation target comprises predicting inherent availability associated with a design characteristic of the operation target, an outlier associated with the pre-operation management, an outlier applying at least one of an abnormal operation and an operation associated with a failure, an abnormality, and a failure.

10. The intelligent operation management device of claim 1, wherein the operation target comprises at least one among a computing device, a server, a network, and a storage, and wherein the pre-operation management is configured to:
generate a graph and natural language based on an analysis result report for the anomaly detection analysis and an analysis result report for the prediction analysis looking for the abnormal traffic, and
perform augmented analytics that comprises natural language in an interpretation of an analysis result.

11. The intelligent operation management device of claim 1, wherein the operation target is an information and communications technology (ICT) infrastructure based on software defined networking (SDN) and network function virtualization (NFV).

12. The intelligent operation management device of claim 1, wherein the cluster analysis performs, by applying an abnormal prediction analysis system (APAS) module to the DCAP module, a hierarchical cluster analysis or a nonhierarchical cluster analysis.

13. The intelligent operation management device of claim 12, wherein the hierarchical cluster analysis is based on at least one among a single linkage method, a complete linkage method, an average linkage method, a centroid linkage method, a Ward linkage method, and a median linkage method, by using a hierarchical clustering model.

14. The intelligent operation management device of claim 12, wherein the nonhierarchical cluster analysis is configured to:
analyze by dividing into groups based on at least one among a K-means method and an X-means method, using a nonhierarchical clustering model, and
represent an analysis result in a graphical form of a tree diagram or a dendrogram.

15. The intelligent operation management device of claim 12, wherein the cluster analysis is configured to derive similarity or distance between the traffic based on at least one among a Euclidean distance, a standardized distance, a Minkowski distance, a Mahalanobis distance, a Kanberra distance, a Chebychev distance, and a Manhattan distance.

16. The intelligent operation management device of claim 1, wherein the prediction analysis looking for the abnormal traffic is based on supervised learning or unsupervised learning, by applying an abnormal prediction analysis system (APAS) module to the DCAP module.

17. An intelligent operation management method for infrastructure, the intelligent operation management method comprising:
collecting data by monitoring a resource of an operation target;
performing an anomaly detection analysis of the collected data by a real-time visualization method;
performing an abnormal detection analysis looking for abnormal traffic for the collected data; and
performing pre-operation management of the operation target based on a result according to the anomaly detection analysis and a result according to the abnormal traffic prediction analysis,
wherein the pre-operation management comprises predicting an outlier, an abnormal fault and a failure of the operation target by using history data of a software error and a fault or failure of hardware of the operation target.

18. A computer program stored in a non-transitory computer-readable storage medium for intelligent operation management of infrastructure, the computer configured to execute, in a computing device:
collecting data by monitoring a resource of an operation target;
performing an anomaly detection analysis of the collected data by a real-time visualization method;
performing an abnormal detection analysis for looking for abnormal traffic for the collected data; and
performing pre-operation management of the operation target based on a result according to the anomaly detection analysis and a result according to the abnormal traffic prediction analysis,
wherein the pre-operation management comprises predicting an outlier, an abnormal fault and a failure of the operation target by using history data of a software error and a fault or failure of hardware of the operation target.

* * * * *